US008077865B2

(12) United States Patent
Matsushima et al.

(10) Patent No.: US 8,077,865 B2
(45) Date of Patent: Dec. 13, 2011

(54) ELECTRONIC DEVICE, CONTENT REPRODUCTION CONTROL METHOD, PROGRAM, STORAGE MEDIUM, AND INTEGRATED CIRCUIT

(75) Inventors: Hideki Matsushima, Osaka (JP); Hiroshi Okuyama, Osaka (JP); Ryousuke Kobayashi, Kanagawa (JP); Tomoyuki Haga, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/850,912

(22) Filed: Aug. 5, 2010

(65) Prior Publication Data

US 2010/0322413 A1    Dec. 23, 2010

Related U.S. Application Data

(62) Division of application No. 12/299,817, filed as application No. PCT/JP2007/060263 on May 18, 2007, now Pat. No. 7,792,292.

(30) Foreign Application Priority Data

May 18, 2006    (JP) ................................. 2006-138444

(51) Int. Cl.
*H04L 9/00* (2006.01)
(52) U.S. Cl. ......................................................... 380/28
(58) Field of Classification Search ...................... 380/28
See application file for complete search history.

(56) References Cited

U.S. PATENT DOCUMENTS

| | | | |
|---|---|---|---|
| 2002/0049679 A1 | 4/2002 | Russell et al. | |
| 2002/0065730 A1 * | 5/2002 | Nii | 705/26 |
| 2003/0001978 A1 | 1/2003 | Smith et al. | |
| 2003/0145329 A1 * | 7/2003 | Candelore | 725/87 |
| 2003/0169288 A1 | 9/2003 | Misawa | |
| 2003/0195855 A1 | 10/2003 | Parks et al. | |
| 2004/0078066 A1 | 4/2004 | Ohta et al. | |
| 2005/0238325 A1 | 10/2005 | Tanabe et al. | |
| 2006/0069650 A1 | 3/2006 | Hori | |
| 2006/0143481 A1 * | 6/2006 | Morten | 713/193 |
| 2006/0168451 A1 * | 7/2006 | Ishibashi et al. | 713/176 |

FOREIGN PATENT DOCUMENTS

| | | |
|---|---|---|
| JP | 2004-135270 | 4/2002 |
| JP | 2002-171494 | 6/2002 |

(Continued)

OTHER PUBLICATIONS

International Search Report issued Aug. 22, 2007 in the International Application No. PCT/JP2007/060263.
Aucsmith, David and Graunke, Gary, "Protecting Software Against Inverse Analysis and Tampering," Nikkei Electronics No. 706, Jan. 1998.
Ishima, Hiroyuki et al., "Tamper Resistant Technology for Software," Fuji Xerox Technical Report, No. 12, 2000.

*Primary Examiner* — David Garcia Cervetti
*Assistant Examiner* — Michael S McNally
(74) *Attorney, Agent, or Firm* — Wenderoth, Lind & Ponack, L.L.P.

(57) ABSTRACT

To play back a content while managing the right of use of the content, such as a total time of playback of the content, an electronic device stores right information in a right temporary storage unit 59 and judges whether or not use of the content is permitted, in a process of decoding a frame. Also, the electronic device updates the right information stored in the right temporary storage unit 59. When the frame to be played back is the one at a predetermined position in order, the electronic device stores the right information stored in the right temporary storage unit 59 into a storage area 20.

16 Claims, 26 Drawing Sheets

FOREIGN PATENT DOCUMENTS

| | | |
|---|---|---|
| JP | 2005-301634 | 10/2005 |
| JP | 2006-127485 | 5/2006 |
| WO | 2006-043786 | 4/2006 |
| WO | WO 2006043786 A1 * | 4/2006 |

* cited by examiner

FIG. 4

Right management table 25

| Content ID 25a | Content key 25b | Right type 25c | Playback number 25d | Right number 25e | Playback total time 25f | Playback right time 25g | Playback deadline 25h |
|---|---|---|---|---|---|---|---|
| 001 | 01011..1 | Limit by number | 1 | 5 | - | - | - |
| 002 | 01010..1 | Limit by period | - | - | - | - | 2006/3/31 |
| 003 | 10010..1 | Limit by time | - | - | 00:06:00 | 00:20:00 | - |
| 004 | 10110..1 | Limit by period/ number | 3 | 10 | - | - | 2006/3/31 |
| 005 | 11110..1 | Unlimited | - | - | - | - | - |

Entry information (row 003)

FIG. 5A

| Pattern | Contents of process |
|---|---|
| Pattern P | Confirmation and update of right |
| Pattern Q | Confirmation, update and writing of right |
| Pattern R | Confirmation of right |
| Pattern S | No confirmation of right |

FIG. 5B

| Frame number | 1 | 2 | 3 | 4 | 5 | 6 | 7 | 8 | 9 | 10 | 11 | · · |
|---|---|---|---|---|---|---|---|---|---|---|---|---|
| Pattern | P | S | Q | R | P | S | Q | R | P | S | Q | · · |

| CPU use rate (%) | Percentage of each pattern | | | |
|---|---|---|---|---|
| | P | Q | R | S |
| 0~20 | 20% | 80% | 0% | 0% |
| 21~40 | 20% | 70% | 10% | 0% |
| 41~60 | 40% | 40% | 10% | 10% |
| 61~80 | 35% | 35% | 10% | 20% |
| 81~100 | 30% | 30% | 20% | 20% |

| CPU use rate (%) | Condition for writing right |
|---|---|
| 0~20 | Writing per 1 frames |
| 21~40 | Writing per 5 frames |
| 41~60 | Writing per 10 frames |
| 61~80 | Writing per 25 frames |
| 81~100 | 1 writing per 1 content |

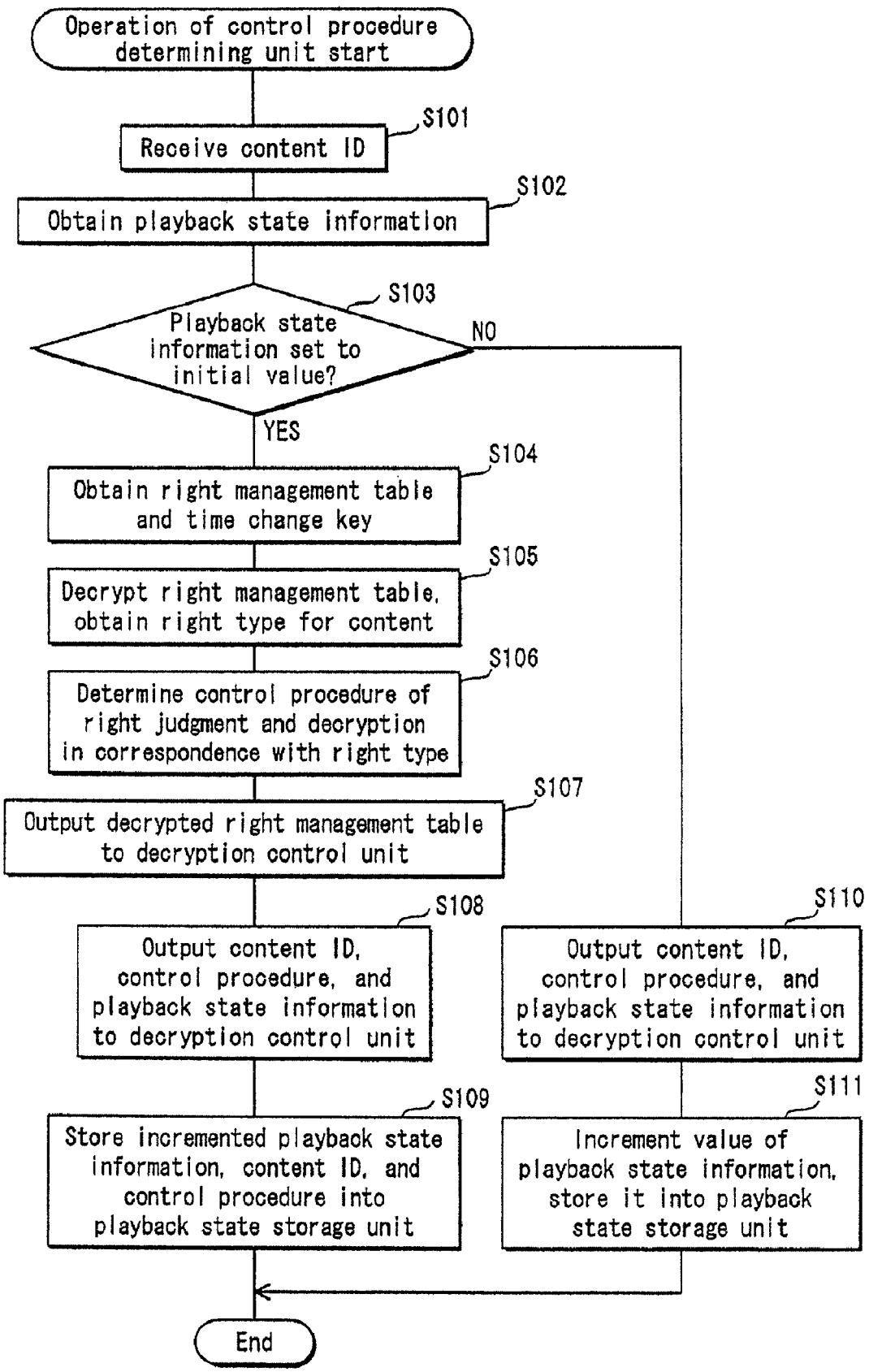

ELECTRONIC DEVICE, CONTENT REPRODUCTION CONTROL METHOD, PROGRAM, STORAGE MEDIUM, AND INTEGRATED CIRCUIT

This application is a Divisional of U.S. application Ser. No. 12/299,817, filed Nov. 13, 2008 now U.S. Pat. No. 7,792,292, which is a national stage application of International Application No. PCT/JP2007/060263, filed May 18, 2007.

BACKGROUND OF THE INVENTION

1. Field of the Invention

The present invention relates to an electronic device for playing back a content while managing the right of the content, and specifically to a technology for making confirmation on and updating the right of the content.

2. Description of the Related Art

With the aim of providing a variety of use forms of contents, a technology for allowing content providers to control the rights of users on the use of the contents has become popular. Such a technology is called DRM (Digital Rights Management). As one example, the OMA (Open Mobile Alliance) DRM standard has been formulated.

In such a DRM technology, the right information which is used to manage the user's right needs to be updated according to the use of content by the user. The Patent Document 1 identified below, for example, discloses a technology for controlling the playback of a content, for which the playback deadline has been set, and the update of the right of the content.

Meanwhile, in recent years, the OMA DRM R2 standard has been formulated. In this standard, "accumulated" is defined as a method for managing the total time of content playback. According to this method, a content is permitted to be played back with an electronic device until a total time of playback of the content reaches an upper limit that is preliminarily set by the right owner. And when the total time of playback has reached the upper limit, the playback is stopped. The above-mentioned OMA DRM R2 standard requires that the playback should be stopped "as accurately as possible in time".

Patent Document 1: Japanese Patent Application Publication No. 2005-301634

Non-Patent Document 1: *"Protecting Software from Inverse Analysis and Modification"*, Nikkei Electronics, Jan. 5, 1998, pp. 209-220

Non-Patent Document 2: *"Technology for Making Software Tamper-Resistant"*, Fuji Zerox™, Technical Report No. 13, pp. 20-28.

BRIEF SUMMARY OF THE INVENTION

However, according to the technology disclosed in Patent Document 1, confirmation of right is performed before a content starts to be played back, and the right is not updated until the playback of the content ends. Therefore, if the right is consumed in the middle of the playback of the content, then the playback of the content cannot be stopped "as accurately as possible in time".

In regards with this matter, to realize the above-mentioned "accumulated" method, the following might be considered. That is to say, the electronic device uses a timer to measure the time and performs confirmation and update of right sequentially in a process that is different from the processes for decrypting and playing back the content, and at a point in time when the right has been consumed, issues an interrupt or the like to stop the operations of the decryption unit decrypting the content, and the playback unit playing back the content.

In general, a content is composed of a plurality of frames, and is decrypted and played back in units of one or more frames. As a result, when, as described above, the operations of the decryption unit and the playback unit are controlled using a timer interrupt or the like in a process that is different from the processes for decrypting and playing back the content, a load is placed onto the electronic device due to overhead by the interrupt when the right is updated. It is highly possible that this might cause, for example, frame dropping or sound jumping, and ill-influence the playback of the content. Furthermore, in many cases, such confirmation and update of right are implemented with a tamper-resistant technology to prevent unauthorized modifications. With these taken into account, it would be unrealistic to implement all the processes concerning confirmation and update of right by hardware since it would cost extremely high.

Also, there may be a case where a frame starts to be decrypted because the right is valid at the point of the decryption start in time, and the operation of the decryption unit is stopped by the timer interrupt. When the decryption unit is stopped, the frame is not decrypted although the right of the frame is originally valid. This means that a frame on which the user originally has a right to play back is not played back, namely, the right is restricted, resulting in reduction of the right of the user.

It is therefore an object of the present invention to provide a technology for controlling the playback of the content by managing the right of the content, without unduly restricting the right of the user and without using a timer interrupt or the like.

The above object is fulfilled by an electronic device for controlling a playback of a content with use of a tamper-resistant module in managing a right of use of the content, the electronic device comprising a storage unit storing right information used for managing whether or not the content can be played back, in a state protected from unauthorized accesses, wherein the tamper-resistant module includes: a receiving unit operable to receive, one by one, a plurality of frames that constitute the content in an encrypted state; a right judging unit operable to perform a judgment of whether or not the content is permitted to be played back, in accordance with the right information; and a control unit operable to (a) cause the right judging unit to perform the judgment each time a value N satisfies a predetermined judgment condition, the value N being a natural number indicating a position of a frame in an order of playback of the frames constituting the content, (b) decrypt the Nth frame when the right judging unit judges affirmatively, and (c) restrict the playback of the content with respect to frames after the Nth frame when the right judging unit judges negatively.

With above-described structure, the electronic device, with use of the control unit, performs the judgment of whether or not the content is permitted to be played back, namely, confirms the right of use of the content, in a process of decrypting the frame.

Accordingly, the confirmation of the right is performed together with the decryption process, and other processes such as a timer interrupt are not required to perform the confirmation of the right. This reduces the possibility of suffering from an ill influence such as overhead due to an interrupt. That is to say, it is possible to confirm the right of use of a content by a realistic method. Also, when the right is valid, the frame is decrypted. This prevents the user's right from being restricted unduly.

In the above-stated electronic device, the right information may include playback total time information and playback right time information, the playback total time information indicating a playback total time which is a total time of playback of the content having been performed, the playback right time information indicating a playback right time being a time period for which the content is permitted to be played back, the right judging unit performs the judgment by comparing the playback right time with a sum of the playback total time and an elapsed time being a time that has elapsed while the content has been played back, and the control unit includes a right updating sub-unit operable to update the playback total time information stored in the storage unit according to the elapsed time, in a process of decrypting the Nth frame when the value N satisfies a predetermined update condition.

With the above-described structure, when the right of use of the content has a limit by the content playback total time, it is possible to play back the content by managing the right of use of the content, not performing other processes such as a timer interrupt.

The above-stated electronic device may further comprise a right temporary storage unit having a storage area which is accessible at a higher speed than the storage unit, wherein the control unit stores the right information stored in the storage unit, into the right temporary storage unit, the right judging unit performs the judgment in accordance with the right information stored in the right temporary storage unit, the right updating sub-unit performs a first process to update the playback total time information stored in the right temporary storage unit according to the elapsed time, in a process of decrypting a frame, and a second process to store the right information stored in the right temporary storage unit, into the storage unit in the process of decrypting the frame, and the control unit causes the right updating sub-unit to perform either the first process or the second process or both thereof, depending on the value N, in the process of decrypting the Nth frame.

The right information is stored in the storage unit in the state protected from unauthorized accesses. Here, the "right information is stored in the state protected from unauthorized accesses" means that the right information is stored in the encrypted state or that the storage unit has a mechanism for preventing unauthorized accesses, or both of them. Accordingly, to access the right information stored in the storage unit, it is necessary to decrypt the right information, perform authentication with the storage unit and the like. That is to say, it is not necessarily possible to access the storage unit at a sufficient speed. Thus it may take time to confirm or update the right.

On the other hand, the electronic device with the above-described structure includes the right temporary storage unit that has a storage area which is accessible at a higher speed than the storage unit, and stores the right information into the right temporary storage unit. And the electronic device manages the right of use of the content in accordance with the right information stored in the right temporary storage unit.

Accordingly, when the processes of confirming and updating the right should be performed as necessary, the electronic device can perform the processes at high speeds.

In the above-stated electronic device, the control unit may perform a third process to cause the right judging unit to perform the judgment, prohibiting the right updating sub-unit from performing any of the first process and the second process, in the process of decrypting the frame, and a fourth process to, in the process of decrypting the frame, prohibit any of the first process, the second process, and the third process, and decrypt the frame, and the control unit performs, in each process of decrypting each frame, one of the third process, the fourth process, the first process by the right updating sub-unit, the second process by the right updating sub-unit, and both the first process and the second process by the right updating sub-unit.

As described above, the storage unit stores the right information in a state protected from unauthorized accesses, and thus accessing the storage unit relatively takes time. That is to say, the electronic device can perform processes at a relatively high speed when it does not access the storage unit. Accordingly, with the above-described structure, the electronic device can update the right information stored in the storage unit in accordance with the processing performance, while performing other processes.

In the above-stated electronic device, the control unit, upon receiving a request to end playing back the content, may store the right information stored in the right temporary storage unit, into the storage unit.

With the above-described structure, it is possible to make the right information accurately reflect the content playback state of the user.

In the above-stated electronic device, the control unit, upon receiving a request to end playing back the content, may delete the right information from the right temporary storage unit.

With the above-described structure where the right information is deleted from the right temporary storage unit, it is possible to prevent unauthorized analyses or the like from being made onto the right information.

In the above-stated electronic device, the control unit, upon receiving a request to end playing back the content, may delete a decryption key from the tamper-resistant module, the decryption key being used when the content in the encrypted state is decrypted.

With the above-described structure, it is possible to reduce the possibility that a decryption key, which is used to decrypt a content, is obtained in an unauthorized manner, and thus enhance the protection of the content.

Meanwhile, the present invention can also be applied to the case where the right of use of a content has a limit by the content playback deadline.

That is to say, in the above-stated electronic device, the right information may include playback deadline information indicating a playback deadline of the content, the electronic device further comprises: a clock operable to measure a time; and a time obtaining unit operable to obtain the time measured by the clock, wherein the control unit causes the time obtaining unit to obtain the time when the right judging unit performs the judgment, and the right judging unit judges negatively when the time obtained when the right judging unit performs the judgment has exceeded the playback deadline indicated by the playback deadline information included in the right information. With the above-described structure, With the above-described structure, when the right of use of the content has a limit by the content playback deadline, it is possible to play back the content by managing the right of use of the content.

Also, when the right of use of the content has a limit by the content playback deadline, and there is a sufficient time before the content playback deadline, the necessity for performing the confirmation of right frequently by placing a load onto the electronic device is relatively low. However, when there is a small amount of time before the playback deadline (for example, when a content is played back on the day being the playback deadline), it is preferable that the frequency of confirming the right is increased and that the playback of the content is stopped immediately after the right becomes invalid.

In view of this, in the above-stated electronic device, the control unit may include a judgment timing determining sub-unit operable to cause the time obtaining unit to obtain the time when the right judging unit performs the judgment, and determine a frequency of judgment performed by the right judging unit, according to a length of a remaining time until the playback deadline indicated by the playback deadline information included in the right information.

With the above-described structure, it is possible to adjust the load to be placed onto the electronic device, in accordance with the length of the remaining time until the content playback deadline.

In the above-stated electronic device, the control unit, in a process of decrypting an initial frame in the playback of the content, may cause the right judging unit to perform the judgment, and prohibits the content from being played back when the right judging unit judges negatively.

With the above-described structure, the content is not played back if, at a point in time when the playback of the content is started, the current time has exceeded the playback deadline.

The above-stated electronic device may further comprise a right temporary storage unit having a storage area which is accessible at a higher speed than the storage unit, the control unit stores the right information stored in the storage unit, into the right temporary storage unit, and the right judging unit performs the judgment in accordance with the right information stored in the right temporary storage unit.

In the above-stated electronic device, the control unit may store the right information stored in the storage unit, into the right temporary storage unit when a playback of a content is started, and delete the right information from the right temporary storage unit when the control unit receives a request to end playing back the content.

In the description provided up to now, the right of use of the content may have a limit by the content playback total time or may have a limit by the content playback deadline. Not limited to these, the present invention can be applied to the case where the right of use of the content has a limit by the total number of playbacks of the content.

That is to say, in the above-stated electronic device, the right information may include playback number information and right number information, the playback number information indicating a number of playbacks being a number of times the content has been played back, the right number information indicating a right number being a number of times the content is permitted to be played back, and the right judging unit judges negatively when the number of playbacks indicated by the right information is equal to or larger than the right number indicated by the right information.

With the above-described structure, when the right of use of the content has a limit by the total number of playbacks of the content, the electronic device can play back the content by managing the right of use of the content.

In the above-stated electronic device, the control unit may cause the right judging unit to perform the judgment in a process of decrypting an initial frame in the playback of the content, and prohibits the playback of the content when the right judging unit judges negatively.

With the above-described structure, the content is not played back if, at a point in time when the playback of the content is started, the number of times the content has been played back has exceeded the number of times the content is permitted to be played back.

Note that, when the right of use of the content has a limit by the total number of playbacks of the content, the right may be consumed by an erroneous playback by the user, against the will of the user. This lacks protection of the user. Also, there may be cases where the content provider provides a trial, permitting the user to use part of the content or to use it only for a limited time period, not counting it as consumption of the right. For example, a content provider of music or moving image contents might want to permit a use of such a content within a predetermined time period for free.

In the above-stated electronic device, the control unit may include a right updating sub-unit operable to refrain from incrementing the number of playbacks in the right information stored in the storage unit when an elapsed time since a start of a playback of the content has not exceeded a predetermined time period, and to increment the number of playbacks when the elapsed time since the start of the playback of the content has exceeded the predetermined time period.

With the above-described structure, even if the user operates erroneously, the right of use of the content is not consumed if the playback of the content is stopped within a predetermined time period. Also, this makes it possible for the content provider to provide a trial of the content to the user under certain conditions.

More specifically, the above-stated electronic device may further comprise: a clock operable to measure a time, wherein the control unit includes: a time obtaining sub-unit operable to obtain the time measured by the clock; a time storage sub-unit storing the time obtained by the time obtaining sub-unit, a start time obtaining sub-unit operable to cause the time obtaining sub-unit to obtain the time when a playback of a content is started, and stores the obtained time into the time storage sub-unit as start time information; a judgment time obtaining sub-unit operable to cause the time obtaining sub-unit to obtain, as a judgment time, the time when a process of decrypting a frame to be played back Nth is performed and the value N satisfies a predetermined update condition; an elapsed time calculating sub-unit operable to calculate an elapsed time in accordance with a difference between the judgment time obtained by the judgment time obtaining sub-unit and a time indicated by the start time information stored in the time storage sub-unit, and the right updating sub-unit refrains from incrementing the number of playbacks in the right information stored in the storage unit when the elapsed time calculated by the elapsed time calculating sub-unit has not exceeded the predetermined time period, and to increment the number of playbacks when the calculated elapsed time has exceeded the predetermined time period.

The above-stated electronic device may further comprise a right temporary storage unit having a storage area which is accessible at a higher speed than the storage unit, wherein the control unit stores the right information stored in the storage unit, into the right temporary storage unit, causes the right judging unit to perform the judgment before the elapsed time since the start of the playback exceeds the predetermined time period, in accordance with the right information stored in the right temporary storage unit, and after the judgment, increments the number of playbacks indicated by the right information stored in the right temporary storage unit, and the right updating sub-unit stores the right information indicating the incremented number of playbacks, stored in the right temporary storage unit, into the storage unit when the elapsed time since the start of the playback has exceeded the predetermined time period.

In the above-stated electronic device, the control unit may include a temporary storage deleting sub-unit operable to delete the right information from the right temporary storage unit when the number of playbacks included in the right information stored in the storage unit by the right updating sub-unit has been incremented.

Also, in the above-stated electronic device, upon receiving a request to end playing back the content, the electronic device may delete the right information from the right temporary storage unit.

In the above description, when the right of use of the content has a limit by the total number of playbacks of the content, the right information is updated after the content has been played back for more than a predetermined time period. However, not limited to this, the following is possible.

That is to say, in the above-stated electronic device, the control unit may include a right updating sub-unit operable to refrain from incrementing the number of playbacks in the right information stored in the storage unit until a predetermined number of frames have been played back since a start of a playback of the content, and to increment the number of playbacks when the predetermined number of frames have been played back.

With the above-described structure, in which the right is updated depending on whether the electronic device has played back a predetermined number of frames, the necessity for a clock for measuring the time or the like is eliminated.

The above-stated electronic device may further comprise a right temporary storage unit having a storage area which is accessible at a higher speed than the storage unit, wherein the control unit stores the right information stored in the storage unit, into the right temporary storage unit, causes the right judging unit to perform the judgment until the predetermined number of frames have been played back since the start of the playback of the content, in accordance with the right information stored in the right temporary storage unit, and after the judgment, increments the number of playbacks indicated by the right information stored in the right temporary storage unit, and the right updating sub-unit stores the right information indicating the incremented number of playbacks, stored in the right temporary storage unit, into the storage unit when the predetermined number of frames have been played back since the start of the playback of the content.

In the above-stated electronic device, the control unit may include a temporary storage deleting sub-unit operable to delete the right information from the right temporary storage unit when the right information indicating the incremented number of playbacks is stored into the storage unit by the right updating sub-unit.

Also, in the above-stated electronic device, the control unit may include a right information deleting sub-unit operable to, upon receiving a request to end playing back the content from a user, delete the right information from the right temporary storage unit.

Here, to enhance the protection of the right of use of the content, the electronic device may have the following structure.

That is to say, in the above-stated electronic device, the right information may include one or more pieces of entry information which correspond, one-to-one, to one or more contents, and each piece of entry information is used to manage whether or not a corresponding content can be played back, and has been encrypted using a different encryption key, the storage unit further stores a key list being a list of keys used to decrypt the one or more pieces of entry information, the key list being stored in a state encrypted using an encryption key, the encryption key used to encrypt the key list is stored as a list encryption key in a state protected from unauthorized accesses, the list encryption key is generated in accordance with a count value provided from a secure counter that is in a state protected from unauthorized accesses, the count value of the secure counter increases or decreases at a predetermined timing, the storage unit generates a list encryption key each time the count value of the secure counter increases or decreases, encrypts the key list using the generated list encryption key, and stores the encrypted key list, and the right judging unit decrypts a piece of entry information corresponding to a content being a target of judgment, using a key contained in the key list that was decrypted using the list encryption key, and performs the judgment using the decrypted piece of entry information.

When the right information is obtained in an unauthorized manner, there is a high possibility that the content may be played back in an unauthorized manner. In regards with this, in the above-described structure, each piece of entry information included in the right information is encrypted using a different encryption key. With such an arrangement, even if the right information is analyzed in an unauthorized manner, it is difficult to analyze the entry information corresponding to all the contents. That is to say, compared with the case where the right information has been encrypted using one encryption key, the protection of the contents is enhanced.

Meanwhile, as described above, when the electronic device performs the process of updating the right information stored in the storage unit, the load placed on the electronic device increases, compared with the case where it does not update the right information. As a result of this, a playback of a content or the like may be ill influenced from this. However, since the electronic device performs various processes, when the electronic device is operating with relatively low load, the frequency of updating the right information stored in the storage unit may be increased depending on the operation state of the electronic device, for example. With this increase of the frequency of updating the right information, when the storage unit keeps the data stored therein even if the power supply to the electronic device is stopped, even if a malicious person stops the power supply to the electronic device to erase the consumption of the right, it is possible to make the influence from the unauthorized action small.

In view of this, the above-stated electronic device may further comprise an environment detection unit operable to manage an operation state of the electronic device, wherein the right updating sub-unit controls a frequency of performing the second process in the playback of the content, in accordance with the operation state managed by the environment detection unit.

With the above-described structure, it is possible to properly determine the percentage of the process with a high load, such as the process of updating the right information stored in the storage unit, in accordance with the operation state of the electronic device. That is to say, when the electronic device is performing a process with a low load, the percentage of the process of updating the right information stored in the storage unit is increased so that the playback of the content is not ill influenced; and when the electronic device is performing a process with a high load, the percentage of this process is decreased.

Also, the above-stated electronic device may further comprise an environment detection unit operable to manage an operation state of the electronic device, wherein the right updating sub-unit controls percentage of the first process, the second process, both the first process and the second process, the third process, and the fourth process, in the playback of the content, in accordance with the operation state managed by the environment detection unit.

With the above-described structure, it is possible to change the percentage of the process of updating the right information stored in the storage unit and the percentage of the judgment process performed by the right judging unit.

Note that the operation state of the electronic device includes the following specific cases.

In the above-stated electronic device, the environment detection unit may manage a CPU use rate of the electronic device, and the right updating sub-unit may control percentage of frames for the second process in accordance with the CPU use rate, in a playback of a content.

With the above-described structure, it is possible to control the percentage of the process of updating the right information stored in the storage unit, in accordance with the CPU use rate of the electronic device.

Also, in the above-stated electronic device, the environment detection unit may manage a content playback time, and the right updating sub-unit may execute the second process when the playback time managed by the environment detection unit exceeds a predetermined time.

With the above-described structure, it is possible to update the right information stored in the storage unit when the content playback time exceeds the predetermined time. This prevents occurrence of a problem that although a content is being played back, the right information is not updated for a long time.

Also, the above-stated electronic device may have a multi-task function, the environment detection unit may manage the number of applications that have been activated simultaneously, and the right updating sub-unit may control the percentage of the frames for the second process in accordance with the number of applications that have been activated simultaneously, managed by the environment detection unit, during a playback of a content.

With the above-described structure, it is possible to control the percentage of the process of updating the right information stored in the storage unit, in accordance with the number of applications that have been activated in the electronic device. For example, when a relatively large number of applications have been activated, the percentage of the process of updating the right information may be reduced.

Also, in the above-stated electronic device, the environment detection unit may manage types of contents to be played back, and the right updating sub-unit may control the percentage of the frames for the second process in accordance with the types of contents managed by the environment detection unit, in a playback of a content.

With the above-described structure, it is possible to control the percentage of the process of updating the right information, by taking into account the process load of the electronic device required for the playback of each type of content. For example, when a moving image, which has a higher load of content playback process than music, is to be played back, the percentage of the process of updating the right information may be reduced, and when music is to be played back, the percentage of the process of updating the right information may be increased.

Also, in the above-stated electronic device, the environment detection unit may manage whether or not the electronic device is in an idle state, and the right updating sub-unit may control the percentage of the frames for the second process depending on whether the electronic device is in the idle state, in a playback of a content.

With the above-described structure, it is possible to control the percentage of the process of updating the right information, depending on whether the electronic device is in the idle state, in a playback of a content. For example, when the electronic device is in the idle state, the percentage of the process of updating the right information may be increased, and when the electronic device is not in the idle state, the percentage of the process of updating the right information may be decreased.

Also, in the above-stated electronic device, the environment detection unit may manage whether or not the electronic device is operating in a power saving mode, and the right updating sub-unit may control the percentage of the frames for the second process depending on whether the electronic device is operating in the power saving mode.

With the above-described structure, it is possible to control the percentage of the process of updating the right information, depending on whether the electronic device is operating in the power saving mode. For example, when the electronic device is not operating in the power saving mode, the percentage of the process of updating the right information may be increased, and when the electronic device is operating in the power saving mode, the percentage of the process of updating the right information may be decreased.

Here, to enhance the protection of the right of the content in the above-stated electronic device, the following is possible.

That is to say, in the above-stated electronic device, the control unit may include a tamper detection sub-unit operable to perform a tamper detection onto part or all of the electronic device at each predetermined timing.

With the above-described structure in which a tamper detection is performed onto part or all of the electronic device at each predetermined timing, it is possible to reduce the possibility that the content is played back in an unauthorized manner.

In the above-stated electronic device, the tamper detection sub-unit, while performing the tamper detection onto part or all of the electronic device, may perform the tamper detection onto part of the electronic device that has not been subjected to tamper detection, each time the tamper detection sub-unit detects a tamper.

There may be a case where it is difficult to perform a tamper detection onto the whole electronic device at once. More specifically, for example, there may be a case where an attempt to perform the tamper detection onto the whole electronic device at once causes an error because it places too much load onto the performance of the electronic device. Even in such a case, with the above-described structure, it is possible to perform the tamper detection onto each part of the electronic device at each timing of the tamper detection. Accordingly, with the above-described structure, it is possible to perform the tamper detection by taking into account the performance ability of the electronic device.

Note that the target of the tamper detection includes the following.

That is to say, in the above-stated electronic device, the tamper detection sub-unit may perform the tamper detection onto a playback application being an application that performs a content playback process.

With the above-described structure, it is possible to detect whether or not the application for performing a content playback process has been tampered, and thus it is possible to reduce the possibility that the content may be played back in an unauthorized manner.

The above-stated electronic device may further comprise a user notification unit operable to notify a user, wherein when the tamper detection sub-unit detects a tamper, the user notification unit notifies the user that the application needs to be updated.

With the above-described structure, it is possible to urge the user to update an application when a tamper is detected in the application. This allows the user to execute an authorized application by the update, resulting in reduction in the possibility that the content may be played back in an unauthorized manner.

In the above-stated electronic device, when the tamper detection sub-unit detects a tamper, the control unit may stop the playback application.

With the above-described structure, it is possible to prevent the content from being played back by an unauthorized application.

Here, the timing of tamper detection includes the following.

That is to say, in the above-stated electronic device, the tamper detection sub-unit may perform the tamper detection at a timing when the right information stored in the storage unit is accessed, in a process of decrypting a frame.

Also, the tamper detection sub-unit may perform the tamper detection in a process of decrypting an initial frame in the playback of the content.

Also, the tamper detection sub-unit may perform the tamper detection each time a predetermined number of frames are decrypted, in the playback of the content.

Also, the tamper detection sub-unit may perform the tamper detection at a timing when the right judging unit performs the judgment.

Also, the control unit may include a tamper detection sub-unit operable to perform a tamper detection onto the electronic device at a predetermined timing, and the tamper detection sub-unit may perform the tamper detection at a timing when the count value of the secure counter increases or decreases.

Also, the control unit may include a tamper detection sub-unit operable to perform a tamper detection onto the electronic device at a predetermined timing, and the tamper detection sub-unit may perform the tamper detection at a timing when a playback application is installed or updated, the playback application being an application that performs a content playback process.

The above-described object is also fulfilled by a content playback control method for managing a right of use of a content and controlling playback of the content, using right information for managing whether or not the content can be played back, the right information stored in a storage unit protected from unauthorized accesses, the content playback control method comprising the steps of: receiving, one by one, a plurality of frames that constitute the content in an encrypted state; performing a judgment on whether or not the content is permitted to be played back, in accordance with the right information; and causing the judgment performing step to perform the judgment each time a value N of a frame that is represented as an Nth frame and received in the receiving step satisfies a predetermined judgment condition, decrypting the Nth frame when the right judging step judges affirmatively, and restricting the playback of the content with respect to frames after the Nth frame when the right judging step judges negatively, the value N being a natural number indicating a position of a frame in an order of playback of the frames constituting the content.

The above-described object is also fulfilled by a control program for causing an electronic device to perform a process of managing a right of use of a content and controlling playback of the content, using right information for managing whether or not the content can be played back, the right information stored in a storage unit protected from unauthorized accesses, the control program comprising the steps of: receiving, one by one, a plurality of frames that constitute the content in an encrypted state; performing a judgment on whether or not the content is permitted to be played back, in accordance with the right information; and causing the judgment performing step to perform the judgment each time a value N of a frame that is represented as an Nth frame and received in the receiving step satisfies a predetermined judgment condition, decrypting the Nth frame when the right judging step judges affirmatively, and restricting the playback of the content with respect to frames after the Nth frame when the right judging step judges negatively, the value N being a natural number indicating a position of a frame in an order of playback of the frames constituting the content.

The above-described object is also fulfilled by a computer-readable recording medium storing a control program for causing an electronic device to perform a process of managing a right of use of a content and controlling playback of the content, using right information for managing whether or not the content can be played back, the right information stored in a storage unit protected from unauthorized accesses, the control program comprising the steps of: receiving, one by one, a plurality of frames that constitute the content in an encrypted state; performing a judgment on whether or not the content is permitted to be played back, in accordance with the right information; and causing the judgment performing step to perform the judgment each time a value N of a frame that is represented as an Nth frame and received in the receiving step satisfies a predetermined judgment condition, decrypting the Nth frame when the right judging step judges affirmatively, and restricting the playback of the content with respect to frames after the Nth frame when the right judging step judges negatively, the value N being a natural number indicating a position of a frame in an order of playback of the frames constituting the content.

The above-described object is also fulfilled by an integrated circuit that manages a right of use of a content and controls playback of the content, using right information for managing whether or not the content can be played back, the right information stored in a storage unit protected from unauthorized accesses, the integrated circuit comprising: a receiving unit operable to receive, one by one, a plurality of frames that constitute the content in an encrypted state; a right judging unit operable to perform a judgment on whether or not the content is permitted to be played back, in accordance with the right information; and a control unit operable to cause the right judging unit to perform the judgment each time a value N of a frame that is represented as an Nth frame and received in the receiving step satisfies a predetermined judgment condition, operable to decrypt the Nth frame when the right judging unit judges affirmatively, and operable to restrict the playback of the content with respect to frames after the Nth frame when the right judging unit judges negatively, the value N being a natural number indicating a position of a frame in an order of playback of the frames constituting the content.

BRIEF DESCRIPTION OF THE DRAWINGS

FIG. 4 shows the right management table 25.

FIGS. 5A and 5B show description of operation patterns of the decryption control unit 57, and relationships between each pattern and frames to be played back.

FIGS. 6A and 6B show the table 26a indicating the CPU use rates of the electronic device 1 in correspondence with the percentages of the patterns, and the writing condition table 26b.

FIG. 7 is a flowchart showing details of the operation of the control procedure determining unit 52.

DETAILED DESCRIPTION OF THE INVENTION

1. Embodiment 1

The following will describe an embodiment of the present invention, with reference to the attached drawings.

In the following embodiment, used as an example is an electronic device 1 that plays back a content while managing the rights of the use of the content. The rights of the use of the content are, for example, a content playback time period, playback deadline, and the number of playbacks. The rights of the use of the content will be described later in detail.

1.1 Summary

A summary of the electronic device 1 will be described with reference to the drawings.

Figure 1:
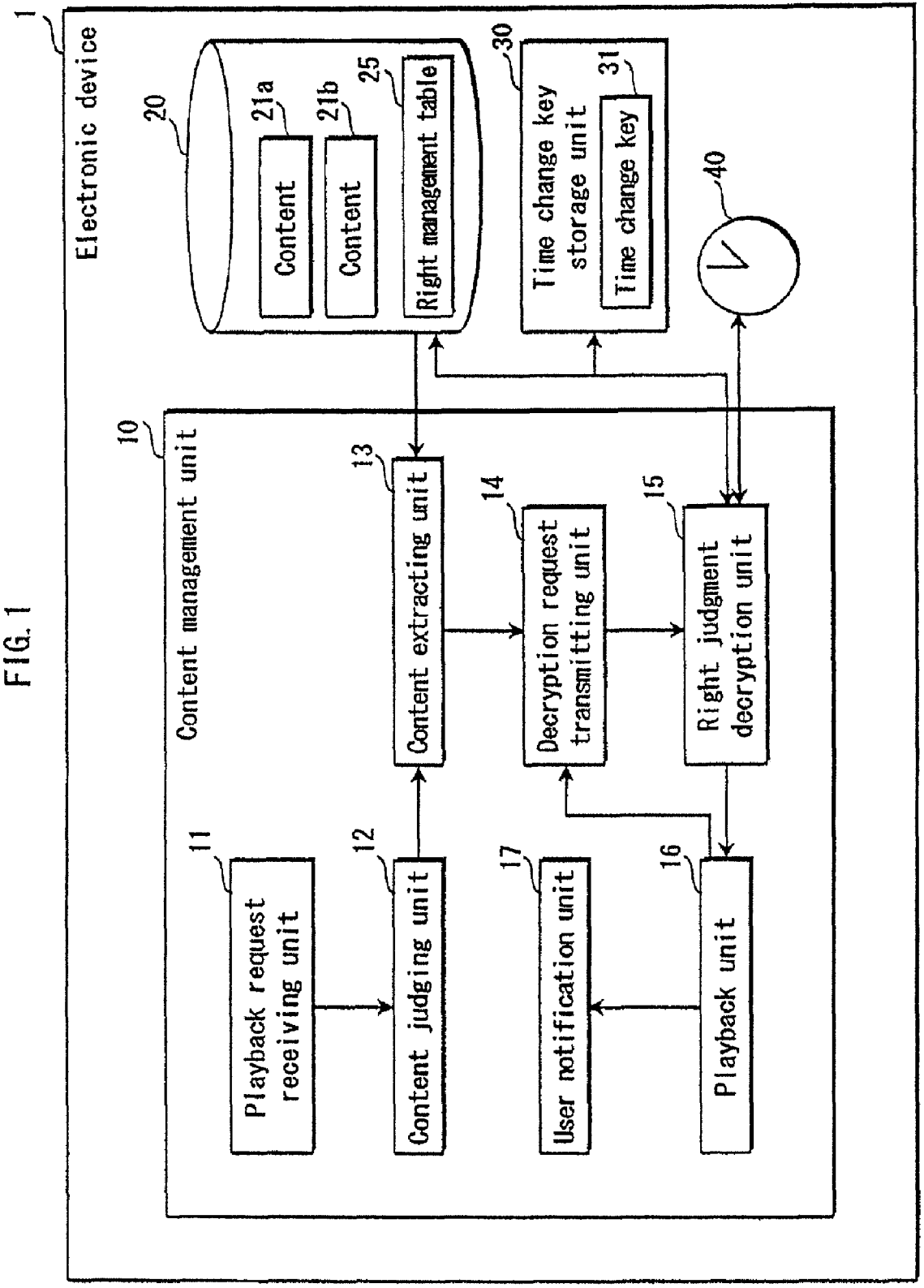
FIG. 1 is a functional block diagram of the electronic device 1 in the present invention.

The electronic device 1 shown in FIG. 1, specifically, has a communication function, and obtains a content via a network by using a content distribution service or the like. The electronic device 1, for example, a set top box, television, HDD (Hard Disk Drive)/DVD (Digital Video Disc) recorder, game device, mobile telephone, or PDA being provided with the communication function. Here, the content is, for example, a moving image, still image, music, map or the like. In general, the content is distributed in the encrypted state.

Also, the electronic device 1 obtains the right information which is used for managing the right of use of content, with use of the communication function. The electronic device 1 performs decryption and playback of the content by referring to the right information.

Figure 3A:
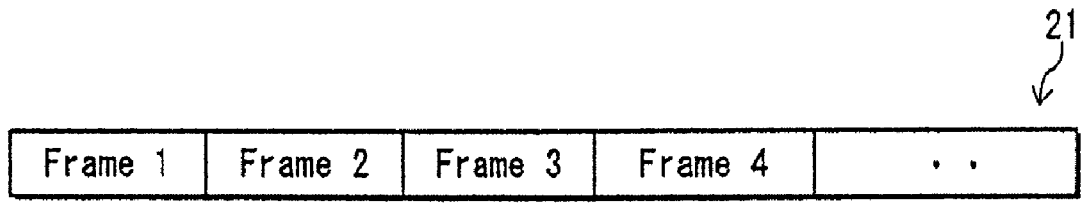
FIGS. 3A to 3D show the content 21, the content management table 22, the content decryption request 23, and the playback state information.

Here, when decrypting an encrypted content and playing back the decrypted content, the electronic device 1 performs the confirmation on right and decryption and playback of the content in units of frames of the codec for the content. As shown in FIG. 3A, a content 21 is composed of a plurality of frames. Also, as a supplemental comment to the frames, in an audio compression codec such as the AAC (Advanced Audio Codec), an audio signal is grouped into blocks per a predetermined number of samples, for example. In this case, each block is processed as one frame. In general, the decoder side performs the playback of content in units of frames.

Figure 2:
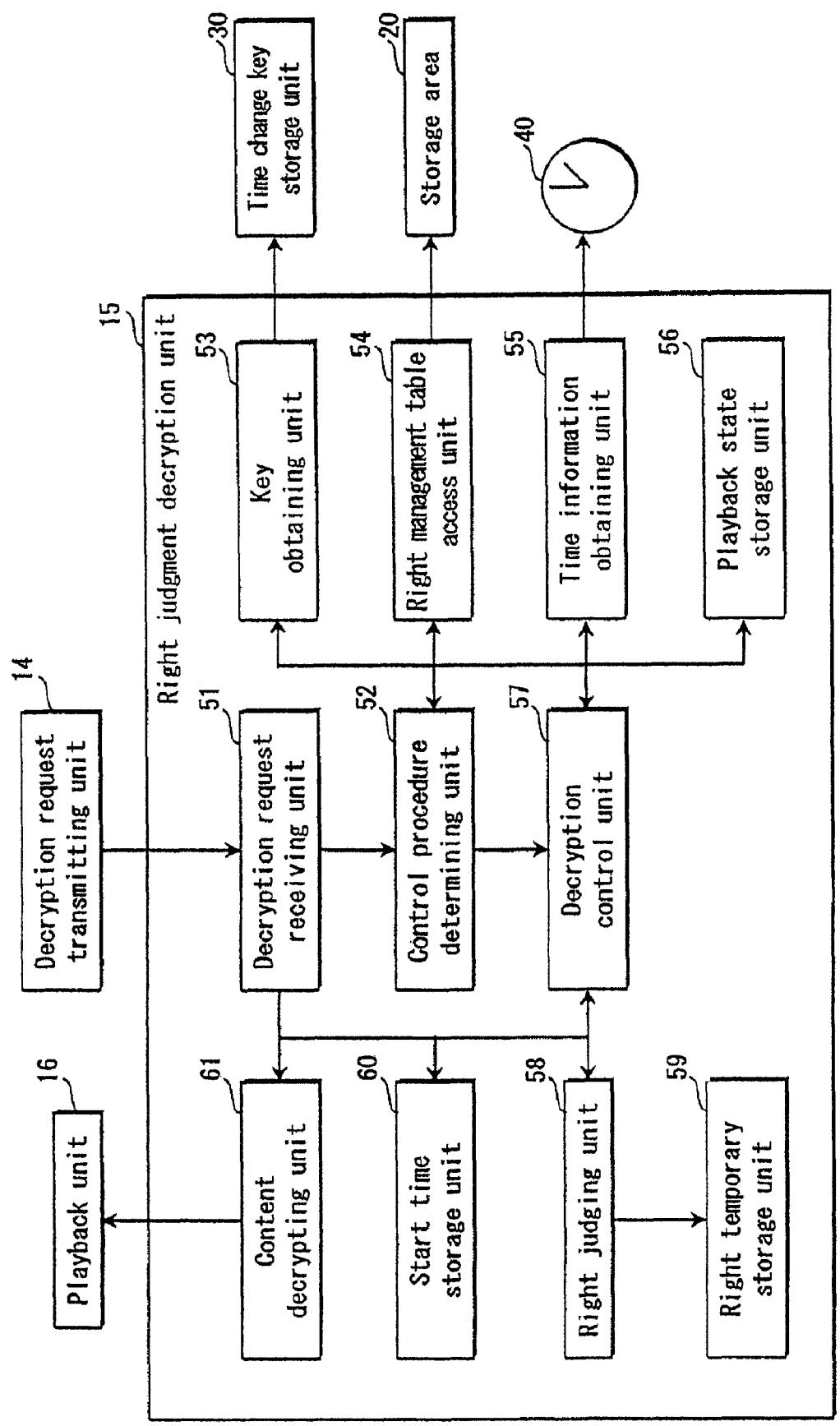
FIG. 2 is a functional block diagram of the right judgment decryption unit 15.

Note that the electronic device 1 stores the obtained right information into the storage area 20, stores at least part of the right information into the right temporary storage unit 59, shown in FIG. 2, that can be accessed at a high speed, and while the content is being played back, sequentially performs the judgment and update of the right using the entry information stored in the right temporary storage unit 59. The entry information is information used for making a judgment on the right, and will be described in detail later. The electronic device 1 writes the updated entry information stored in the right temporary storage unit 59 into the storage area 20, in accordance with the number played-back frames. With this structure, it is possible to perform the confirmation on the right and update of the right, while making the right information in the storage area 20 reflect the contents of the update. With this structure, even if a malicious person stops the power supply to the right temporary storage unit 59 to erase the storage contents thereof to erase the data indicating, for example, the consumption of the time permitted to play back the content by right, the right information having been updated to some extent and written into the storage area can be preserved. This enables the advantage obtained by the malicious person to be reduced.

Note that, although in the above description, the content is obtained with use of the communication function, the communication function may not necessarily be used to obtain the content. For example, a recording medium such as an SD memory card may be attached to the electronic device 1, and the content recorded on the recording medium may be obtained.

1.2 Structure

Next, the structure of the electronic device 1 will be described specifically.

FIG. 1 is a functional block diagram of the electronic device 1 in the present invention.

As shown in FIG. 1, the electronic device 1 includes a content management unit 10, a storage area 20, a time change key storage unit 30, and a secure clock 40.

1.2.1 Content Management Unit 10

The content management unit 10 plays back an obtained content while managing the rights of the use of the content. The content management unit 10 will be described later in detail.

1.2.2 Storage Area 20

The storage area 20 stores one or more contents 21 (content 21a, content 21b, ...) obtained by the electronic device 1. The storage area 20 also stores management information (right management table 25). Note that the right management table 25 has been encrypted using a time change key 31 stored in the time change key storage unit 30 which will be described later. It is preferred that, to prevent a malicious tampering, the contents or the right management table 25 stored in the storage area 20 are stored in the encrypted state, or the storage area 20 itself is achieved by a secure flash or the like that has a mechanism for preventing unauthorized accesses. In the present embodiment, the contents are encrypted by an encryption algorithm such as AES (Advanced Encryption Standard) based on the assumption that the user of the electronic device 1 may re-distribute a content to another user of another electronic device. Note that the encryption algorithm used for encrypting the contents is not limited to the AES, but may be any other encryption algorithm. Note also that the decryption key used for decrypting an encrypted content is contained in the right management table 25. Also, in the present embodiment, to prevent the encrypted contents or the like from being analyzed, the storage area 20 has a mechanism for preventing unauthorized accesses. Note that contents, the right management table 25 and the like may be stored in the encrypted state in a storage having a mechanism for preventing unauthorized accesses.

Here will be described the right management table 25 stored in the storage area 20.

FIG. 4 shows the right management table 25.

As shown in FIG. 4, each piece of record (hereinafter referred to as "entry information") contained in the right management table 25 includes a content ID 25a, a content key 25b, a right type 25c, a playback number 25d, a right number 25e, a playback total time 25f, a playback right time 25g, and a playback deadline 25h.

The content ID 25a indicates an identifier of a content.

The content key 25b is a decryption key used to decrypt the content indicated by the content ID 25a. When the content has been encrypted by the AES as an encryption algorithm, the decryption key should be 128-bit or 192-bit information.

The right type 25c indicates a type of right for the content indicated by the content ID 25a. The right type will be described in detail later.

The playback number 25d indicates the number of times that the content indicated by the content ID 25a has been played back. Each time the content is played back, the value of the playback number 25d is updated.

The right number 25e the number of times that the content indicated by the content ID 25a is permitted to be played back.

The playback total time 25f indicates a total time in which the content indicated by the content ID 25a was played back. Each time the content is played back, the value of the playback total time 25f is updated as much as the playback time thereof.

The playback right time 25g indicates a total time permitted for the content indicated by the content ID 25a to be played back.

The playback deadline 25h indicates a deadline by which the content indicated by the content ID 25a is permitted to be played back.

Here will be described the right type. The right type indicates how the right to use a content is limited. In the present embodiment, there are five right types: "limit by number", "limit by period", "limit by time", "limit by period/number", and "unlimited".

The right type "limit by number" is a right type where the content provider preliminarily sets the upper limit for the number of times that the content can be played back. With reference to FIG. 4, in an example where the content ID 25a is "001", the playback number 25d and the right number 25e indicate that the user has consumed one of five times that the user is permitted to play back the content.

The right type "limit by period" is a right type where the content provider preliminarily sets a time period during which the content can be played back. With reference to FIG. 4, in an example where the content ID 25a is "002", the playback deadline 25h indicates that the last day of the playback time period is Mar. 31, 2006.

The right type "limit by time" is a right type where the content provider preliminarily sets the total time in which the content can be played back. With reference to FIG. 4, in an example where the content ID 25a is "003", the playback right time 25g indicates that the time permitted for the playback is 20 minutes in total, and the playback total time 25f indicates that the user consumed six minutes out of the permitted 20 minutes for playback.

The right type "limit by period/number" is a right type where the content provider preliminarily sets the time period during which the content can be played back, and also sets the upper limit for the number of times that the content can be played back within the set time period. It is a combination of the right types "limit by period" and "limit by number". That is to say, the playback of the content is prohibited when conditions in regards with both of the right types "limit by period" and "limit by number" are not satisfied (when the permitted playback period expires and the permitted number of times is consumed). Note that, alternatively to this arrangement, the playback of the content may be prohibited when a condition in regards with either the right type "limit by period" or "limit by number" is not satisfied (when the permitted playback period expires or the permitted number of times is consumed). With reference to FIG. 4, in an example where the content ID 25a is "004", the playback deadline 25h indicates that the last day of the playback time period is Mar. 31, 2006, the playback number 25d and the right number 25e indicate that the user has consumed three of ten times that the user is permitted to play back the content.

The right type "unlimited" is a right type where there is no limit to the time period or the number of times that the content can be played back. Note that the names of the right types are not limited to those provided above. Also, right types other than those explained above may be provided to be managed in the right management table 25.

Here, back to the description of the storage area 20, the storage area 20 may be achieved by a storage medium, such as a nonvolatile memory or HDD, that keeps on storing data even when power is not supplied thereto.

As described earlier, the storage area 20 has a mechanism for preventing unauthorized accesses. This requires the processes for encrypting and decrypting data, and processes for confirming the authenticity of a user who is requesting an access thereto. Accordingly, it is difficult to access the storage area 20 at high speeds.

1.2.3 Time Change Key Storage Unit 30

The time change key storage unit 30 is a storage unit, such as a secure memory, that has a mechanism for preventing unauthorized accesses, and stores the time change key 31.

As described earlier, the time change key 31 is an encryption key used for encrypting the right management table 25. The time change key storage unit 30 generates the time change key 31 based on a count value provided by a secure counter that is not illustrated. The secure counter counts up at a predetermined timing. For example, the secure counter counts up each time a predetermined number of frames in a content is decrypted. Each time the count value of the secure counter changes, the time change key 31 is generated. And each time the time change key 31 is generated, the time change key storage unit 30 updates the time change key 31 stored therein. Note that, each time the time change key 31 is generated, the right management table 25 in the storage area 20 is decrypted with use of the time change key 31 before the update, and is encrypted with use of the time change key 31 after the update. That is to say, the right management table 25 is always re-encrypted with use of the newest time change key 31.

1.2.4 Secure Clock 40

The secure clock 40 measures the time, and, upon request by the time information obtaining unit 55, outputs a measured time as the time information. The secure clock 40 has a mechanism for preventing unauthorized accesses, and it is difficult for an unauthorized person to rewrite the secure clock 40.

The secure clock 40 measures the time in several units including days. That is to say, the secure clock 40 measures the time in units of month, day, hour, minute, second, and a unit smaller than second, for example, 1/30 second. However, the time for use is not limited to this. For example, information of the dates may be stored in other location, and the secure clock 40 may not measure the dates.

1.2.5 Detail of Content Management Unit 10

Here will be described the detail of the content management unit 10.

As shown in FIG. 1, the content management unit 10 includes a playback request receiving unit 11, a content judging unit 12, a content extracting unit 13, a decryption request transmitting unit 14, a right judgment decryption unit 15, a playback unit 16, and a user notification unit 17.

Note that, since the content management unit 10 plays back a content while managing the rights of the use of the content, it is preferable that the content management unit 10 is protected from unauthorized accesses such as tampering. It is thus preferable that part or all of the content management unit 10 is implemented to be tamper-resistant. For implementing the content management unit 10 to be tamper-resistant, for example, a technology disclosed in International Publication Pamphlet WO 2004/013744 A2 may be used.

1.2.6 Playback Request Receiving Unit 11

The playback request receiving unit 11 receives specification of a content to be played back, the specification being made by an operation of the user. For example, the content management unit 10 displays a list of contents on a display unit (not illustrated), and the user performs an operation onto an operation unit (not illustrated) to select a certain content. This enables the playback request receiving unit 11 to receive specification by the user of a content to be played back.

1.2.7 Content Judging Unit 12

The content judging unit 12 identifies the content ID and the standard information in correspondence with the content specified by the user. The content judging unit 12 outputs the identified content ID and standard information to the content extracting unit 13. Note that the standard information is mainly used to identify the right judgment decryption unit 15, and the content ID is mainly used to read the content from the storage area 20 and to identify the limit to the right in regards with the content (the right type 25c).

Note that the standard information is information that indicates a codec of the content. Examples of codecs are: AAC in case the content is music; MPEG2 (Motion Picture Expert Group 2) in case the content is a moving picture; and JPEG (Joint Photographic Expert Group) in case the content is a static picture.

1.2.8 Content Extracting Unit 13

The content extracting unit 13 reads out the playback-target content from the storage area 20.

Figure 3B:
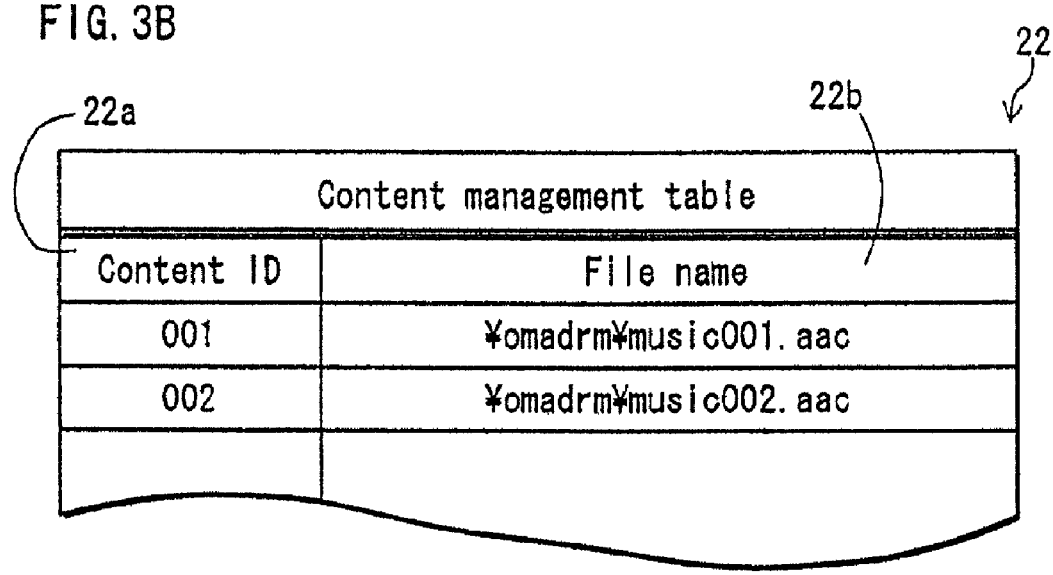

More specifically, the content extracting unit 13 stores a content management table 22 shown in FIG. 3B. As shown in FIG. 3B, each piece of record contained in the content management table 22 includes a content ID 22a and a file name 22b. The content ID 22a indicates an identifier of a content. The file name 22b indicates a location, in the directory structure of the storage area 20, in which the content is stored. Note that the correspondence between the location in the directory and the address in the storage area 20 is managed by the OS (Operating System) of the electronic device 1.

The content extracting unit 13 receives the standard information and content ID from the content judging unit 12. The content extracting unit 13, based on the content management table 22, identifies the location in the storage area 20 where the content identified by the content ID is stored. The content extracting unit 13 then reads out the content from the identified location in the storage area 20.

The content extracting unit 13 outputs the read-out content and the standard information and content ID received from the content judging unit 12, to the decryption request transmitting unit 14.

Note that the whole content may be read out at once, or the content may be read out from the storage area 20 in a unit of a predetermined size of data, such as 50 KB of data.

1.2.9 Decryption Request Transmitting Unit 14

The decryption request transmitting unit 14 identifies, from among one or more right judgment decryption units 15, a right judgment decryption unit 15 to be used for decrypting a content. The decryption request transmitting unit 14 then outputs the content in units of frames to the identified right judgment decryption unit 15. Note that the right judgment decryption units 15 are provided in correspondence with the standard information for the contents on a one-to-one basis.

More specifically, the decryption request transmitting unit 14 receives a content, a content ID, and a piece of standard information from the content extracting unit 13, identifies a right judgment decryption unit 15 based on the received standard information, analyzes the frames of the content, and outputs a content decryption request for every predetermined number of frames, for example, for every frame, to the identified right judgment decryption unit 15, where the content decryption request requests decryption of a content.

Figure 3C:
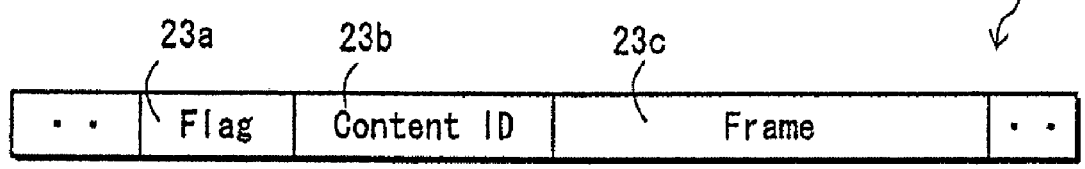

FIG. 3C shows a content decryption request 23. As shown in FIG. 3C, the content decryption request 23 includes a flag 23a, a content ID 23b, and a frame 23c. The flag 23a indicates whether or not a content decryption request, which requests decryption of the content identified by the content ID 23b, is output for the first time. The content ID 23b indicates an identifier of the content concerning the content decryption request 23. The frame 23c is a predetermined number of frames being a decryption target of the content decryption request 23.

The decryption request transmitting unit 14 turns on the flag 23*a* of the content decryption request 23 when it outputs the content decryption request 23 to the right judgment decryption unit 15 for the first time in regards to content after a playback of the content is started.

When receiving, from the playback unit 16, a stop request requesting to stop transmission of frame, the decryption request transmitting unit 14 stops outputting the content decryption request 23 to the right judgment decryption unit 15.

1.2.10 Right Judgment Decryption Unit 15

The right judgment decryption unit 15 makes judgments on the right of a content, and controls the playback of the content based on the result of the judgments.

More specifically, the right judgment decryption unit 15 receives the content decryption request 23 from the decryption request transmitting unit 14, and makes judgments on the right based on the content decryption request 23. When it judges that the user has the right to use the content, the right judgment decryption unit 15 outputs the playback permission information and the decrypted frames to the playback unit 16; and when it judges that the user does not have the right to use the content, the right judgment decryption unit 15 outputs the playback non-permission information to the playback unit 16.

The right judgment decryption unit 15 initializes the data it holds when the flag 23*a* in the received content decryption request 23 has been turned on. In this initialization, for example, the data stored in the right temporary storage unit 59, which will be described later, and the content key held by the content decrypting unit 61 are deleted. These information are deleted so as to prevent an unauthorized access to the key information or the like that was used in the previous playback of content and is held by the right judgment decryption unit 15. The right judgment decryption unit 15 will be described in detail later. The right judgment decryption unit 15 makes judgments on the right and decrypts contents. For this reason, it is preferable that the right judgment decryption unit 15, especially among the components of the content management unit 10, is implemented to be tamper-resistant.

As described above, the right judgment decryption unit 15 deletes part of the data it holds when the flag 23*a* has been turned on. However, not limited to this, a space in the memory may be allocated to a content playback process when the flag 23*a* has been turned on.

1.2.11 Playback Unit 16

The playback unit 16 controls the playback of content in accordance with the processing results of the right judgment decryption unit 15.

More specifically, when receiving the playback permission information and the decrypted frames from the right judgment decryption unit 15, the playback unit 16 decodes the frames and outputs decoded data to an output unit (not illustrated).

Also, when receiving the playback non-permission information from the right judgment decryption unit 15, the playback unit 16 requests the user notification unit 17 to notify the user that the user does not have the right to play back. The playback unit 16 further outputs a stop request, which instructs to stop transmitting frames, to the decryption request transmitting unit 14.

1.2.12 User Notification Unit 17

The user notification unit 17 notifies the user of a message by displaying the message on a display unit (not illustrated), outputting the message as voices/sounds through a speaker or the like.

Especially, the user notification unit 17 notifies the user of a message indicating whether or not the user has the right to use a content. As a specific notification method, a dialog may be displayed, or a beep sound may be output. And not limited to these methods, any known or common notification method using an image or voices/sounds may be used.

When the electronic device 1 supports music distribution or the like, it may notify the user of a message that urges the user to buy a right to use a content. For example, the message urging the user to buy a right may be notified to the user when the expiration of the right (for example, a right to play back a content) owned by the user is nearing, as well as when it is judged that the user does not have the right.

1.3 Detail of Right Judgment Decryption Unit 15

Here will be described the detail of the right judgment decryption unit 15.

FIG. 2 is a functional block diagram of the right judgment decryption unit 15.

As shown in FIG. 2, the right judgment decryption unit 15 includes a decryption request receiving unit 51, a control procedure determining unit 52, a key obtaining unit 53, a right management table access unit 54, a time information obtaining unit 55, a playback state storage unit 56, a decryption control unit 57, a right judging unit 58, a right temporary storage unit 59, a start time storage unit 60, and a content decrypting unit 61.

1.3.1 Decryption Request Receiving Unit 51

The decryption request receiving unit 51 receives the content decryption request 23 from the decryption request transmitting unit 14. The decryption request receiving unit 51 then outputs the frame of the content contained in the content decryption request 23, to the content decrypting unit 61. The decryption request receiving unit 51 also outputs the content ID to the control procedure determining unit 52.

1.3.2 Control Procedure Determining Unit 52

The control procedure determining unit 52, when a playback of a content is started, determines a control procedure that indicates the procedure of the content right judgment and decryption.

It is presumed that the control procedure is preliminarily stored in a storage unit such as a predetermined memory, in correspondence with the right types on a one-to-one basis. The control procedure determining unit 52 receives a content ID from the decryption request receiving unit 51, obtains the right management table 25, and obtains a right type of the content from the content ID and the right management table 25. The control procedure determining unit 52 then reads a control procedure corresponding to the obtained right type, and outputs the control procedure to the decryption control unit 57.

The operation of the control procedure determining unit 52 will be described in detail later.

1.3.3 Key Obtaining Unit 53

The key obtaining unit 53, depending on the operation of the control procedure determining unit 52 and the control of the decryption control unit 57, obtains the time change key 31 from the time change key storage unit 30, where the time change key 31 is used for encrypting the right management table 25.

1.3.4 Right Management Table Access Unit 54

The right management table access unit 54 accesses the right management table 25 in the storage area 20. More specifically, the right management table access unit 54, depending on the operation of the control procedure determining unit 52 and the control of the decryption control unit 57, performs a process such as reading out the right management table 25 from the storage area 20.

1.3.5 Time Information Obtaining Unit 55

The time information obtaining unit 55, depending on the control of the decryption control unit 57, obtains the time information from the secure clock 40.

1.3.6 Playback State Storage Unit 56

Figure 3D:
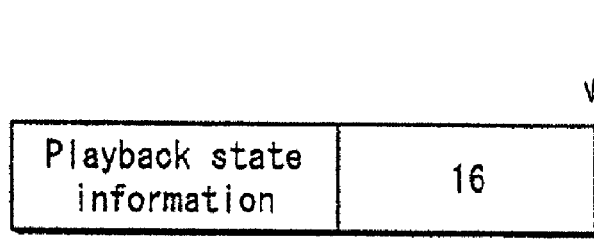

The playback state storage unit 56 stores the playback state information that indicates how many frames have been played back since a content concerned started to be played back. The playback state information indicates it by, for example, the number of frames having been played back, as shown in FIG. 3D. It is presumed here that the initial value of the playback state information is 0. Also, when the flag 23a in the content decryption request 23 received by the decryption request receiving unit 51 has been turned on, the value of the playback state information returns to the initial value 0.

The playback state storage unit 56 stores the content ID of the content being played back by the electronic device 1, the control procedure determined by the control procedure determining unit 52, and a playback permission flag that indicates whether or not a playback of the content is permitted.

1.3.7 Decryption Control Unit 57

The decryption control unit 57 receives the control procedure from the control procedure determining unit 52, and according to the received control procedure, controls the processing. More specifically, depending on the number indicated in the playback state information, namely, the number of played-back frames, the decryption control unit 57 causes the right judging unit 58 to make a judgment on the right, controls determination on whether or not to perform decryption based on the judgment result, updates the right management table 25 or the like.

More specifically, in the present embodiment, the decryption control unit 57 can perform four patterns of processes as shown in FIG. 5A, using the right judging unit 58 and the like. The procedures for the four patterns of processes are indicated in the control procedure determined by the control procedure determining unit 52.

Here, a supplementary explanation will be provided in regards with FIG. 5A. FIG. 5A shows that confirmation of right and update of right are conducted in the pattern P process. The confirmation of right here refers to the process performed by the right judging unit 58. Also, the update of right refers to the update of the entry information stored in the right temporary storage unit 59 which will be described later.

In the pattern Q process, the confirmation of right, update of right, and writing of right are conducted. The writing of right refers to the process where the right management table 25 is read out from the storage area 20, the right management table 25 is updated to reflect the update of the entry information stored in the right temporary storage unit 59, and the updated right management table 25 is written to the storage area 20.

In the pattern R process, the confirmation of right is conducted. That is to say, update of the entry information stored in the right temporary storage unit 59 is not performed.

In the pattern S process, frames are decrypted without the confirmation of right or the like. The frames are decrypted also in the pattern P, Q, R processes when it is confirmed that the right to use the content is valid.

In the present embodiment, as shown in FIG. 5B, each frame to be played back is assigned with one of the four patterns of processes. More specifically, the four patterns are assigned one by one cyclically to each of the frames aligned in the order of playback. The decryption control unit 57 stores the frame numbers N (each frame being identified as $N^{th}$ frame in the order of playback, starting with 1, N being a natural number) in correspondence with the four patterns of processes that are assigned as described above. In the case of an example shown in FIG. 5B, when the obtained playback state information indicates "2", it indicates that two frames have already been played back, and thus the decryption control unit 57 performs the pattern Q process corresponding to the third frame (N=3).

Note that, not limited to the above-described assignment method where each value of N is assigned with any of the four patterns, each frame whose value of N satisfies a predetermined equation may be assigned with a predetermined pattern of process. For example, the pattern P process may be performed for each frame whose value of N is an odd number (satisfying equation "N=2n+1", where "n" being an integer of 0 or higher), and the pattern Q process may be performed for each frame whose value of N is an even number (satisfying equation "N=2n", where "n" being an integer of 1 or higher).

The operation of the decryption control unit 57 will be described in detail later.

1.3.8 Right Judging Unit 58

The right judging unit 58 judges, based on the information received from the decryption control unit 57, whether or not the right to use the content is valid, and outputs the result of the judgment to the decryption control unit 57. The right judging unit 58 stores the entry information of the content for playback into the right temporary storage unit 59 before it performs the judgment. The right judging unit 58 updates and outputs the entry information stored in the right temporary storage unit 59, under the control of the decryption control unit 57.

The operation of the right judging unit 58 will be described in detail later.

1.3.9 Right Temporary Storage Unit 59

The right temporary storage unit 59 is a storage medium that is accessible at a higher speed than the storage area 20. The right temporary storage unit 59 is, for example, a volatile memory.

The right temporary storage unit 59 stores the entry information that is used for the judgment on the right. It is presumed that, since the right temporary storage unit 59 is accessible at a higher speed than the storage area 20, the entry information stored in the right temporary storage unit 59 is not in the encrypted state. For this reason, compared with a case where the right management table 25 is read out from the storage area 20 for each update, the entry information stored in the right temporary storage unit 59 can be updated at a high speed in parallel with the playback of the content. With this structure, for example, a playback of a content can be stopped immediately when the playback total time 25f for the playback of the content reaches the time indicated by the playback right time 25g.

However, since the high-speed access is prioritized over the encryption, the right temporary storage unit 59 has less security strength than the storage area 20. Also, the right temporary storage unit 59 may be realized by, for example, a volatile memory so as to achieve the high-speed access. In that case, the data stored therein is erased when the power supply thereto is stopped. This means that the entry information having been updated and stored in the right temporary storage unit 59 may be erased. This mechanism may be abused by a malicious person. That is to say, the malicious person may stop the power supply thereto to erase the entry information that was updated when the person consumed the right, so that the consumption of the right is not recognized correctly. To prevent such an abuse, in the present embodiment, the decryption control unit 57 performs the pattern Q process at a predetermined timing so that the right management table 25 in the storage area 20 reflects the contents of updates made onto the entry information stored in the right temporary storage unit 59.

As described above, the right temporary storage unit 59 is realized by a volatile memory to achieve the high-speed access thereto. However, not limited to this, the right temporary storage unit 59 may be realized by a nonvolatile memory in so far as it does not interfere with the playback of content, or the entry information may be stored in the right temporary storage unit 59 in the encrypted state.

1.3.10 Start Time Storage Unit 60

The start time storage unit 60 stores time information that is used in the judgment made by the right judging unit 58. The time information is obtained by the time information obtaining unit 55.

1.3.11 Content Decrypting Unit 61

The content decrypting unit 61 decrypts frames constituting contents, under the control of the decryption control unit 57.

More specifically, the content decrypting unit 61 receives frames from the decryption request receiving unit 51. The content decrypting unit 61 also receives the playback permission information or the playback non-permission information from the decryption control unit 57. The content decrypting unit 61 further receives the content key from the decryption control unit 57. The content decrypting unit 61 stores the received content key. The content decrypting unit 61, upon receiving the playback permission information from the decryption control unit 57, decrypts a frame using the received content key, and outputs the decrypted frame and the playback permission information to the playback unit 16. Upon receiving the playback non-permission information from the decryption control unit 57, the content decrypting unit 61 does not decrypt a frame, and outputs the playback non-permission information to the playback unit 16. In this case, the content decrypting unit 61 may erase the content key to prevent it from being stolen. Also, the erasure of the content key may be performed when the user performs an operation for ending playing back a content.

1.4 Operation

In the following, the operation of each functional block constituting the electronic device 1 will be described. In the following description, it is presumed that the right type is "limit by time".

1.4.1 Details of Operation of Control Procedure Determining Unit 52

The control procedure determining unit 52 determines a control procedure indicating an operation procedure of the decryption control unit 57. Also, the control procedure determining unit 52 operates differently depending on whether the time of the operation is immediately after a start of a playback of a content or the time of the operation is during the playback.

FIG. 7 is a flowchart showing details of the operation of the control procedure determining unit 52. Now, the operation will be described with reference to the drawing. The control procedure determining unit 52 receives a content ID from the decryption request receiving unit 51 (S101). Upon receiving the content ID, the control procedure determining unit 52 obtains the playback state information from the playback state storage unit 56 (S102).

The control procedure determining unit 52 judges whether or not the playback state information has been set to the initial value (S103).

1.4.1.1 Operation when Playback State Information has been Set to Initial Value

Here, the operation of the control procedure determining unit 52 immediately after a start of a playback of a content will be described. When it is judged that the playback state information has been set to the initial value (YES in S103), the control procedure determining unit 52 causes the key obtaining unit 53 to obtain the time change key 31, and causes the right management table access unit 54 to obtain the right management table 25 (S104).

The control procedure determining unit 52 decrypts the right management table 25 using the obtained time change key 31. Then, using the content ID received in step S101 as a key, the control procedure determining unit 52 obtains, from the decrypted right management table 25, a right type indicated by the right type 25c for the content to be played back (S105). The control procedure determining unit 52 then determines a control procedure by reading out a control procedure of right judgment and decryption that has been predetermined in correspondence with the obtained right type (S106). In this example in Embodiment 1, it is presumed that the control procedure determining unit 52 reads out a control procedure corresponding to the right type "limit by time".

After it determines a control procedure, the control procedure determining unit 52 outputs the decrypted right management table 25 to the decryption control unit 57 (S107). The control procedure determining unit 52 then outputs the determined control procedure, obtained playback state information, and received content ID to the decryption control unit 57 (S108). The control procedure determining unit 52 then increments the value of the playback state information by one, and stores the incremented playback state information, the content ID, and the control procedure into the playback state storage unit 56 (S109).

1.4.1.2 Operation when Playback State Information has not been Set to Initial Value Here, the operation of the control procedure determining unit 52 during the playback of the content will be described. When it is judged that the playback state information has not been set to the initial value (NO in S103), the control procedure determining unit 52 reads out the playback state information, content ID, and control procedure from the playback state storage unit 56, and output them to the decryption control unit 57 (S110). The control procedure determining unit 52 then increments the value of the playback state information by one, and stores the incremented playback state information into the playback state storage unit 56 (S111).

1.4.2 Details of Operation of Decryption Control Unit 57

Next, the operation of the decryption control unit 57 will be described in detail. The decryption control unit 57 controls the judgment of the right and decryption in accordance with the value of N, where N, as in $N^{th}$ frame, indicates a frame number in the order of playback. The decryption control unit 57 also operates differently depending on whether the time of the operation is immediately after a start of a playback of a content or the time of the operation is during the playback. The contents of the operation performed by the decryption control unit 57 are indicated by the control procedure determined by the control procedure determining unit 52.

Figure 8:
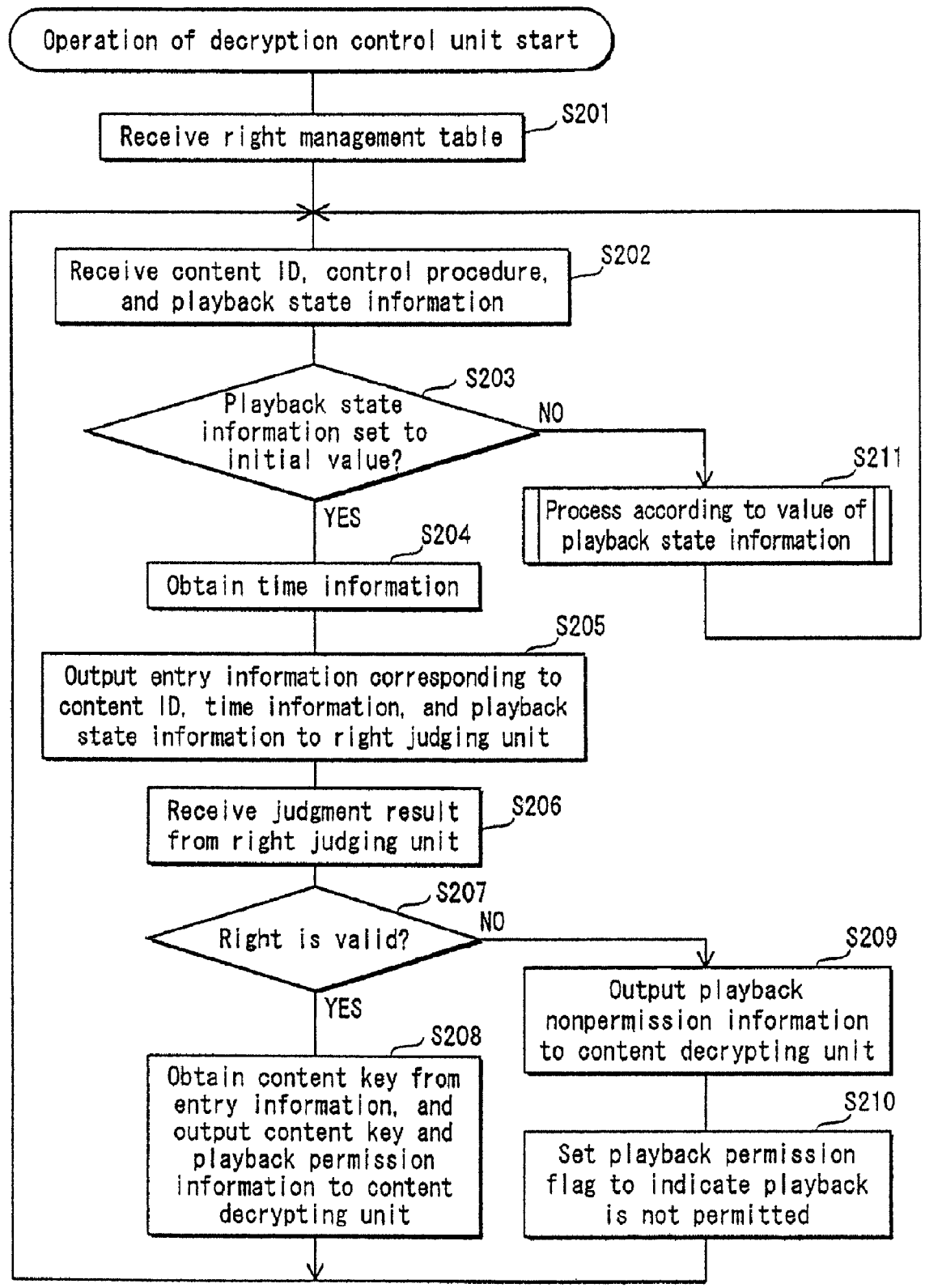
FIG. 8 is a flowchart showing details of the operation of the decryption control unit 57.

FIG. 8 is a flowchart showing details of the operation of the decryption control unit 57. Now, the operation will be described with reference to the drawing. The decryption control unit 57 first receives the right management table 25 from the control procedure determining unit 52 (S201). The decryption control unit 57 also receives the content ID, control procedure, and playback state information from the control procedure determining unit 52 (S202).

The decryption control unit 57 judges whether or not the received playback state information has been set to the initial value (S203).

1.4.2.1 Operation when Playback State Information has been Set to Initial Value

Here, the operation of the decryption control unit 57 immediately after a start of a playback of a content will be described. When it is judged that the playback state information has been set to the initial value (YES in S203), the decryption control unit 57 causes the time information obtaining unit 55 to obtain the time information from the secure clock 40 (S204). The decryption control unit 57 also extracts entry information corresponding to the received content ID, from the right management table 25 received in step S25, and outputs the extracted entry information, the time information obtained in step S204, and the playback state information received in step S202 to the right judging unit 58 (S205).

After the right judging unit 58 makes a judgment on the right, the decryption control unit 57 receives the result of the judgment from the right judging unit 58 (S206). The decryption control unit 57 then judges whether the right is valid based on the received judgment result (S207). When it judges the right as valid (YES in S207), the decryption control unit 57 outputs, to the content decrypting unit 61, the content key indicated by the content key 25b in the entry information, and the playback permission information for controlling the operation of the content decrypting unit 61 (S208).

When it judges the right as invalid (NO in S207), the decryption control unit 57 outputs the playback non-permission information for controlling the operation of the content decrypting unit 61, to the content decrypting unit 61 (S209). The decryption control unit 57 also sets the playback permission flag stored in the playback state storage unit 56 to a value that indicates that the playback is not permitted (S210), and returns to step S202.

1.4.2.2 Operation when Playback State Information has not been Set to Initial Value Here, the operation of the decryption control unit 57 during the playback of the content will be described. When it is judged that the playback state information has not been set to the initial value (NO in S203), the decryption control unit 57 determines, based on the value indicated in the playback state information, a pattern of a process of right judgment and decryption for the frame specified by the decryption request received by the decryption request receiving unit 51 (refer to FIGS. 5A and 5B for the patterns), and performs a process according to the determined pattern (S211). After completion of this step, the control returns to step S202. Note that details of the patterns will be described later.

Here, how the decryption control unit 57 determines the process pattern will be described, using an example shown in FIG. 5B. In the example shown in FIG. 5B, when the playback state information indicates "2", it indicates that two frames have already been subjected to the decryption process, and the next frame to be played back is the third frame. In this case, the decryption control unit 57 determines the pattern Q for the process of right judgment and decryption, as shown in FIG. 5B.

1.4.2.3 Operation in Pattern Q

Here will be described the pattern Q process performed in step S211 by the decryption control unit 57 referring to the value indicated by the playback state information, namely, the process in which the decryption control unit 57 causes the right judging unit 58 to make a judgment on the right, update the entry information stored in the right temporary storage unit 59, and update the right management table 25 in the storage area 20 to reflect the update of the entry information stored in the right temporary storage unit 59.

Figure 9:
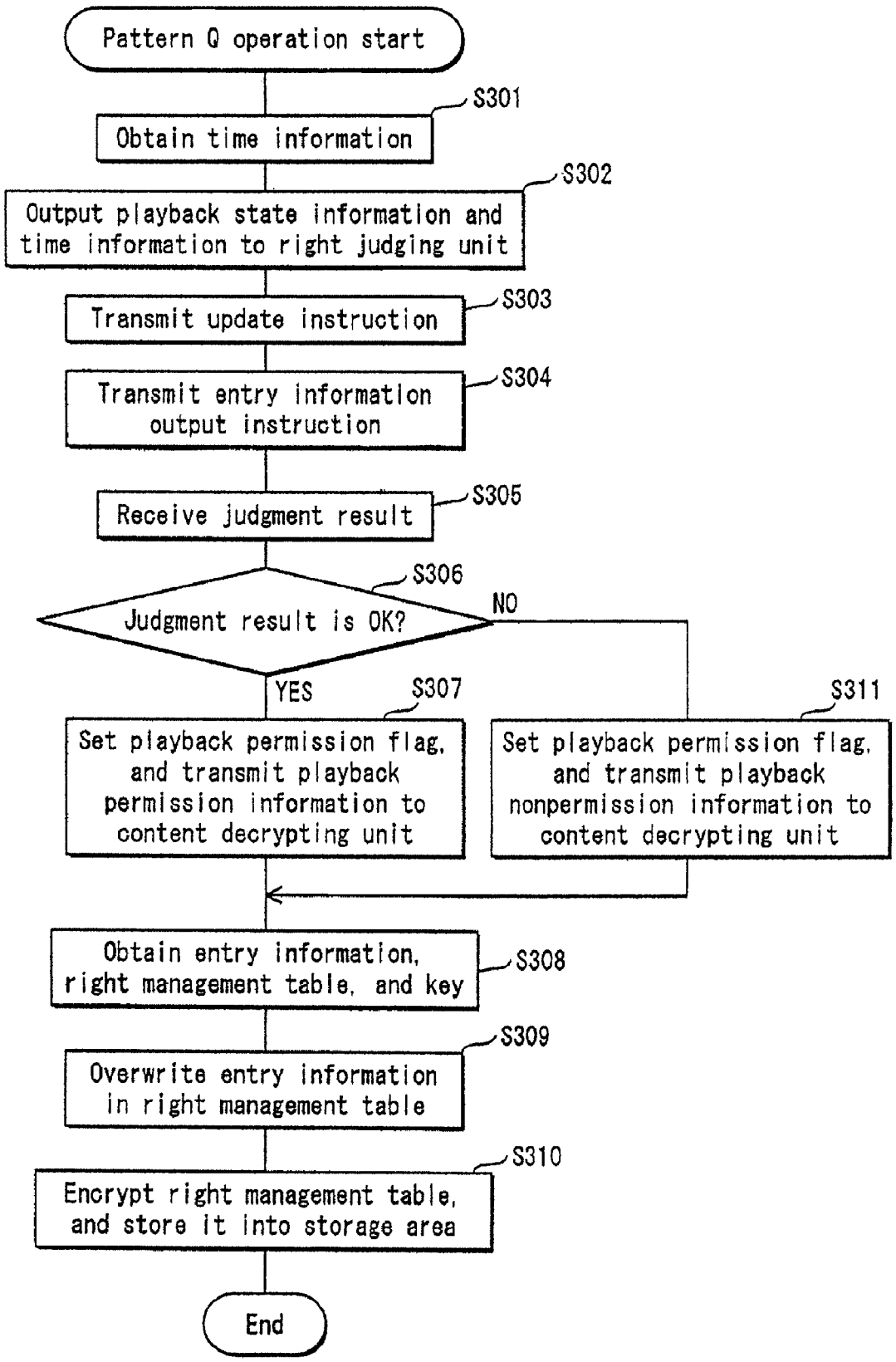
FIG. 9 is a flowchart of the pattern Q process performed in step S211 by the decryption control unit 57.

FIG. 9 is a flowchart of the pattern Q process performed in step S211 by the decryption control unit 57.

The decryption control unit 57 causes the time information obtaining unit 55 to obtain the time information (S301). The decryption control unit 57 outputs the obtained time information and the playback state information received from the control procedure determining unit 52 to the right judging unit 58 (S302). The decryption control unit 57 also outputs an update instruction to the right judging unit 58, where the update instruction instructs the right judging unit 58 to update the contents of the right temporary storage unit 59 (S303). The decryption control unit 57 also outputs an entry information output instruction to the right judging unit 58, where the entry information output instruction instructs the right judging unit 58 to output the contents of the right temporary storage unit 59 to the decryption control unit 57 (S304).

After the right judging unit 58 makes a judgment, the decryption control unit 57 receives the result of the judgment from the right judging unit 58 (S305). When it is judged that the right judging unit 58 has judged that the right is valid (YES in S306), the decryption control unit 57 sets the playback permission flag in the playback state storage unit 56 to a value indicating that the playback is permitted, and outputs the playback permission information to the content decrypting unit 61 (S307).

The decryption control unit 57 also receives the entry information from the right judging unit 58 when it is output therefrom according to the entry information output instruction. The decryption control unit 57 causes the key obtaining unit 53 to obtain the time change key 31. The decryption control unit 57 causes the right management table access unit 54 to obtain the right management table 25 (S308). The decryption control unit 57 decrypts the right management table 25 using the time change key 31. The decryption control unit 57 then overwrites the entry information in the right management table 25 specified by the content ID (obtained in step S202 from the control procedure determining unit 52), with the entry information received from the right judging unit 58 (S309).

The decryption control unit 57 encrypts the right management table 25 after the overwriting of the entry information, using the time change key 31, and causes the right management table access unit 54 to store the encrypted right management table 25 into the storage area 20 (S310).

When it is judged that the right judging unit 58 has judged that the right is invalid (NO in S306), the decryption control unit 57 sets the playback permission flag in the playback state storage unit 56 to a value indicating that the playback is not permitted, and outputs the playback non-permission information to the content decrypting unit 61 (S311). After this, steps S308 through S310 are performed.

1.4.2.4 Operation in Other Patterns

Here will be described the processes of the other patterns.

Pattern P

In the pattern P, as shown in FIGS. 5A and 5B, the right judging unit 58 confirms the right and updates the entry information stored in the right temporary storage unit 59. In the pattern P, the process of updating the right management table 25 in the storage area 20 to reflect the update of the entry information, as performed in the pattern Q, is not performed. In the pattern P, the steps of the flowchart shown in FIG. 9, except for steps S304, S308, S309, and S310, are performed.

Pattern R

In the pattern R, as shown in FIGS. 5A and 5B, the right judging unit 58 confirms the right. In the pattern R, the steps of the flowchart shown in FIG. 9, except for steps S303, S304, S308, S309, and S310, are performed.

Pattern S

In the pattern S, as shown in FIGS. 5A and 5B, the confirmation of the right is not performed, but merely the decryption of the frames is performed. In the pattern S, step S307 of the flowchart shown in FIG. 9 is performed.

1.4.3 Details of Operation of Right Judging Unit 58

Next, the operation of the right judging unit 58 will be described in detail.

The right judging unit 58 makes a judgment on the right. The right judging unit 58 also updates or outputs the storage contents of the right temporary storage unit 59 in accordance with the update instruction or the entry information output instruction from the decryption control unit 57. Also, the right judging unit 58 operates differently depending on whether the time of the operation is immediately after a start of a playback of a content or the time of the operation is during the playback.

Figure 10:
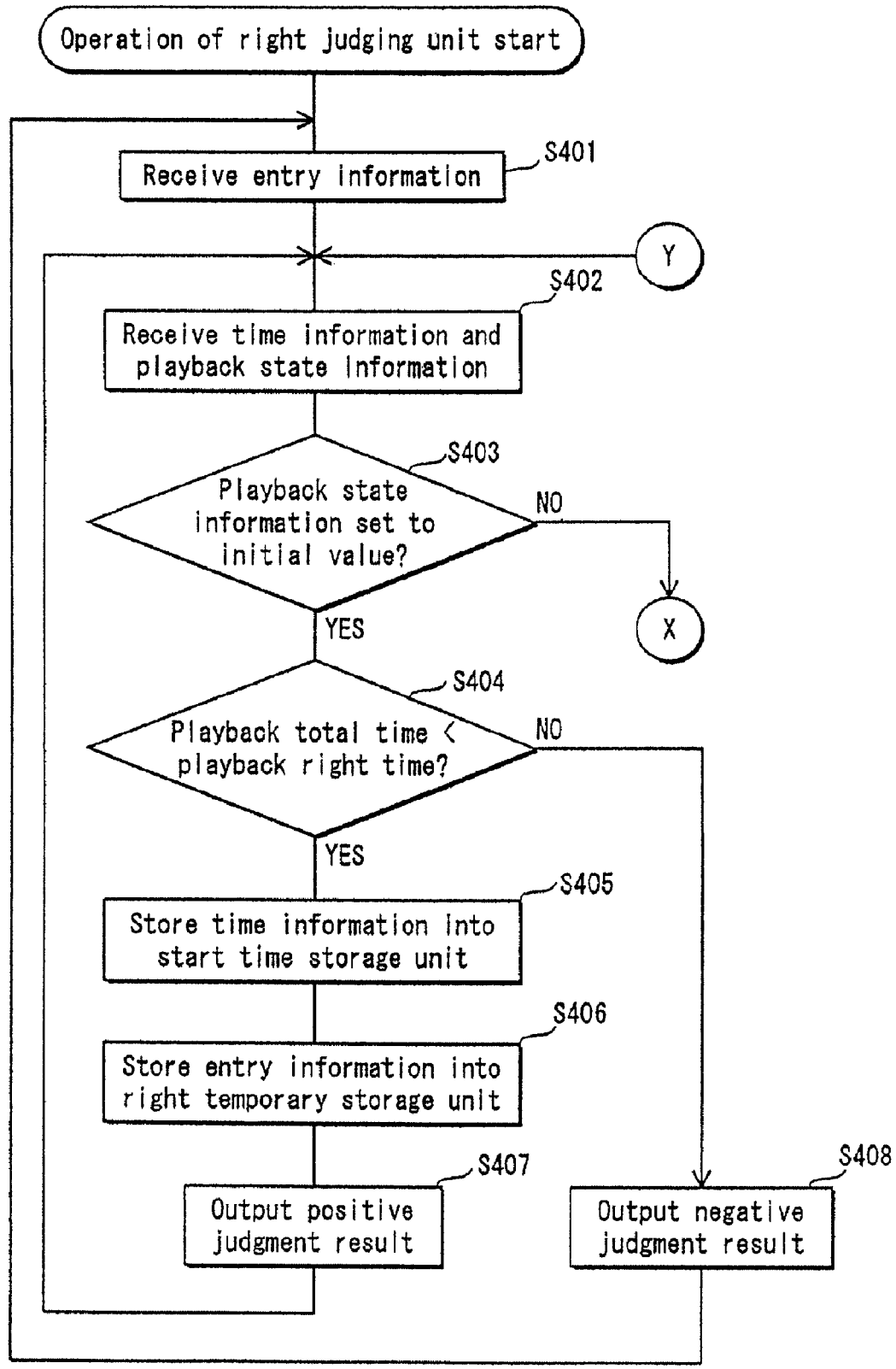
FIG. 10 is a flowchart showing details of the operation of the right judging unit 58.

FIG. 10 is a flowchart showing details of the operation of the right judging unit 58. Now, the operation will be described with reference to the drawing. The right judging unit 58 first receives the entry information from the decryption control unit 57 that was output therefrom in step S205 (S401). The right judging unit 58 also receives the time information and the playback state information that were output from the decryption control unit 57 in step S205 or S302 (S402).

The right judging unit 58 judges whether or not the received playback state information has been set to the initial value (S403).

1.4.3.1 Operation when Playback State Information has been Set to Initial Value Here, the operation of the right judging unit 58 immediately after a start of a playback of a content will be described. When it is judged that the playback state information has been set to the initial value (YES in S403), the right judging unit 58 refers to the playback total time 25$f$ and the playback right time 25$g$ in the entry information obtained in step S401, and judges whether or not the time indicated by the playback total time 25$f$ (hereinafter, referred to as "playback total time") is smaller than the time indicated by the playback right time 25$g$ (hereinafter, referred to as "playback right time"), namely, judges whether the following condition is satisfied (S404).

playback total time<playback right time

When it is judged that the playback total time is equal to or larger than the playback right time (NO in S404), namely, when the right to use the content has been consumed, the right judging unit 58 outputs a judgment result indicating that the right is invalid, to the decryption control unit 57 (S408). The control then returns to step S401.

When it is judged that the playback total time is smaller than the playback right time (YES in S404), namely, when the right to use the content has not been consumed, the right judging unit 58 stores the time information obtained in step S402 into the start time storage unit 60 (S405). The right judging unit 58 also stores the entry information into the right temporary storage unit 59 (S406). After this, the right judging unit 58 judges whether or not the right is valid, using the entry information stored in the right temporary storage unit 59. The right judging unit 58 outputs a judgment result indicating that the right is valid, to the decryption control unit 57 (S407). The control then returns to step S402.

1.4.3.2 Operation when Playback State Information has not been Set to Initial Value Here, the operation of the right judging unit 58 during the playback of the content, namely the operation when it is judged that the playback state information has not been set to the initial value (NO in S403) will be described.

Figure 11:
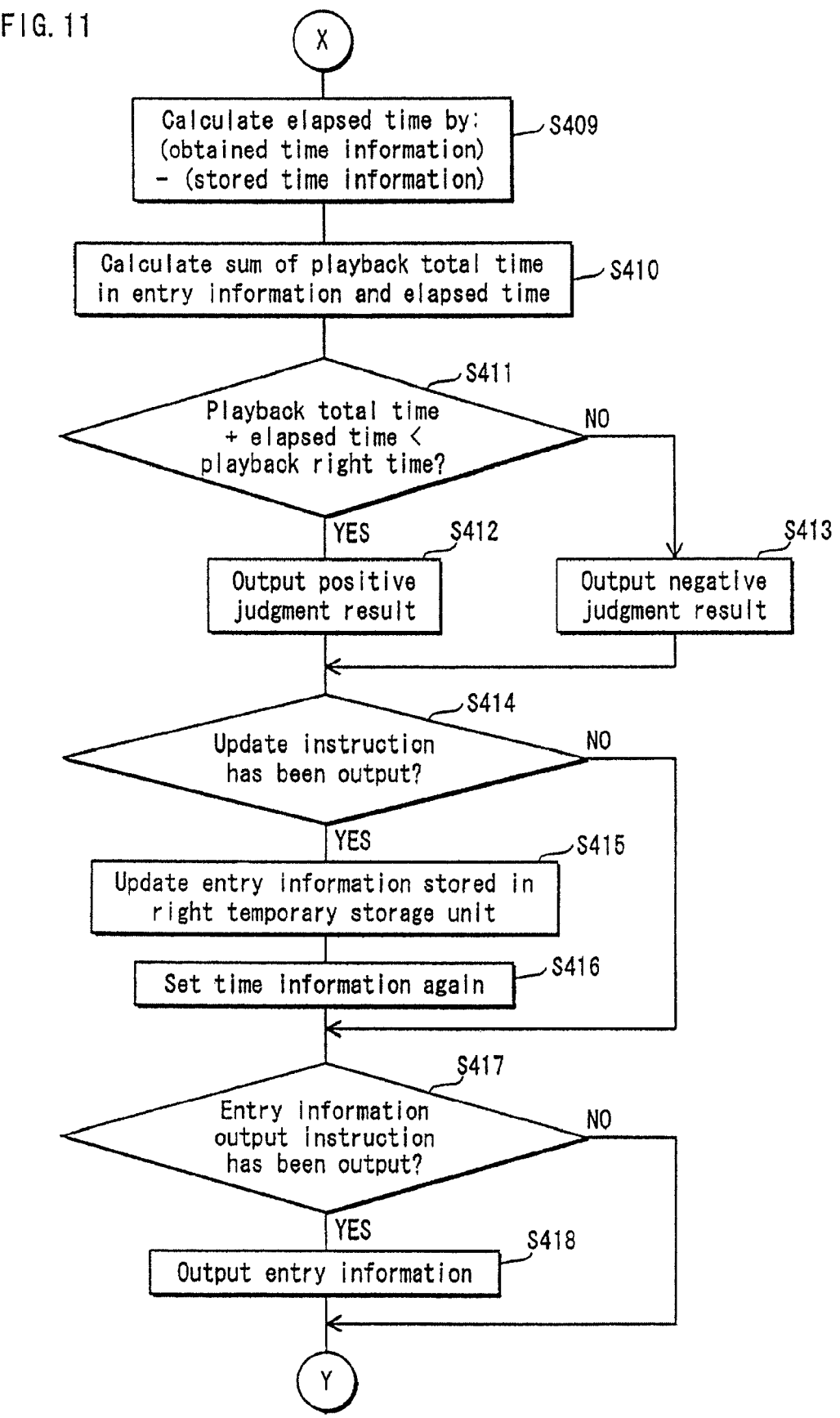
FIG. 11 is a flowchart showing the operation of the right judging unit 58 during the playback of the content.

FIG. 11 is a flowchart showing the operation of the right judging unit 58 during the playback of the content. Since the operation is to be performed during the playback of the content, the start time storage unit 60 stores the time information corresponding to a previous judgment. Note that the right judging unit 58 operates in accordance with the update instruction and the entry information output instruction received from the decryption control unit 57.

The right judging unit 58 calculates an elapsed time by subtracting the time indicated by the time information stored in the start time storage unit 60 from the time indicated by the time information obtained in step S402 (S409). The elapsed time is a time period that has passed since a previous update of the storage contents of the right temporary storage unit 59. After calculating the elapsed time, the right judging unit 58 obtains the playback total time and the playback right time from the entry information stored in the right temporary storage unit 59, calculates a sum of the obtained playback total time and the calculated elapsed time (S410), and judges whether the calculated sum is smaller than the playback right time (S411). That is to say, the right judging unit 58 judges whether the following condition is satisfied.

playback total time+elapsed time<playback right time

When it is judged in step S411 that the calculated sum is smaller than the playback right time, it means that the right has not yet been consumed. In this case, therefore, the right judging unit 58 outputs, to the decryption control unit 57, a judgment result indicating that the right is valid (S412). On the other hand, when it is judged in step S411 that the calculated sum is equal to or larger than the playback right time, it means that the right has already been consumed. In this case, therefore, the right judging unit 58 outputs, to the decryption control unit 57, a judgment result indicating that the right is invalid (S413).

1.4.3.3 Operation Depending on Instruction from Decryption Control Unit 57

After the above-described judgment, the right judging unit 58 operates depending on the update instruction and the entry information output instruction from the decryption control unit 57.

The right judging unit 58 judges whether the update instruction has been output from the decryption control unit 57 (S414).

When the update instruction has been output (YES in S414), it is necessary to update the storage contents of the right temporary storage unit 59. In this case, the right judging unit 58 overwrites the playback total time 25$f$ in the entry information stored in the right temporary storage unit 59, with the sum (playback total time+elapsed time) calculated in step S410 (S415). The right judging unit 58 then stores the time information obtained in step S402 into the start time storage unit 60 (S416). When the update instruction has not been output (NO in S414), the above-described steps S415 and S416 are omitted.

The right judging unit 58 then judges whether the entry information output instruction has been output from the decryption control unit 57 (S417).

When the entry information output instruction has been output (YES in S417), the right judging unit 58 reads out the entry information from the right temporary storage unit 59, and outputs the read-out entry information to the decryption control unit 57 (S418). When the entry information output instruction has not been output (NO in S417), the above-described step S418 is omitted.

After this, the right judging unit 58 returns to step S402.

1.4.4 Outline of Operations of Functional Blocks

Figure 12:
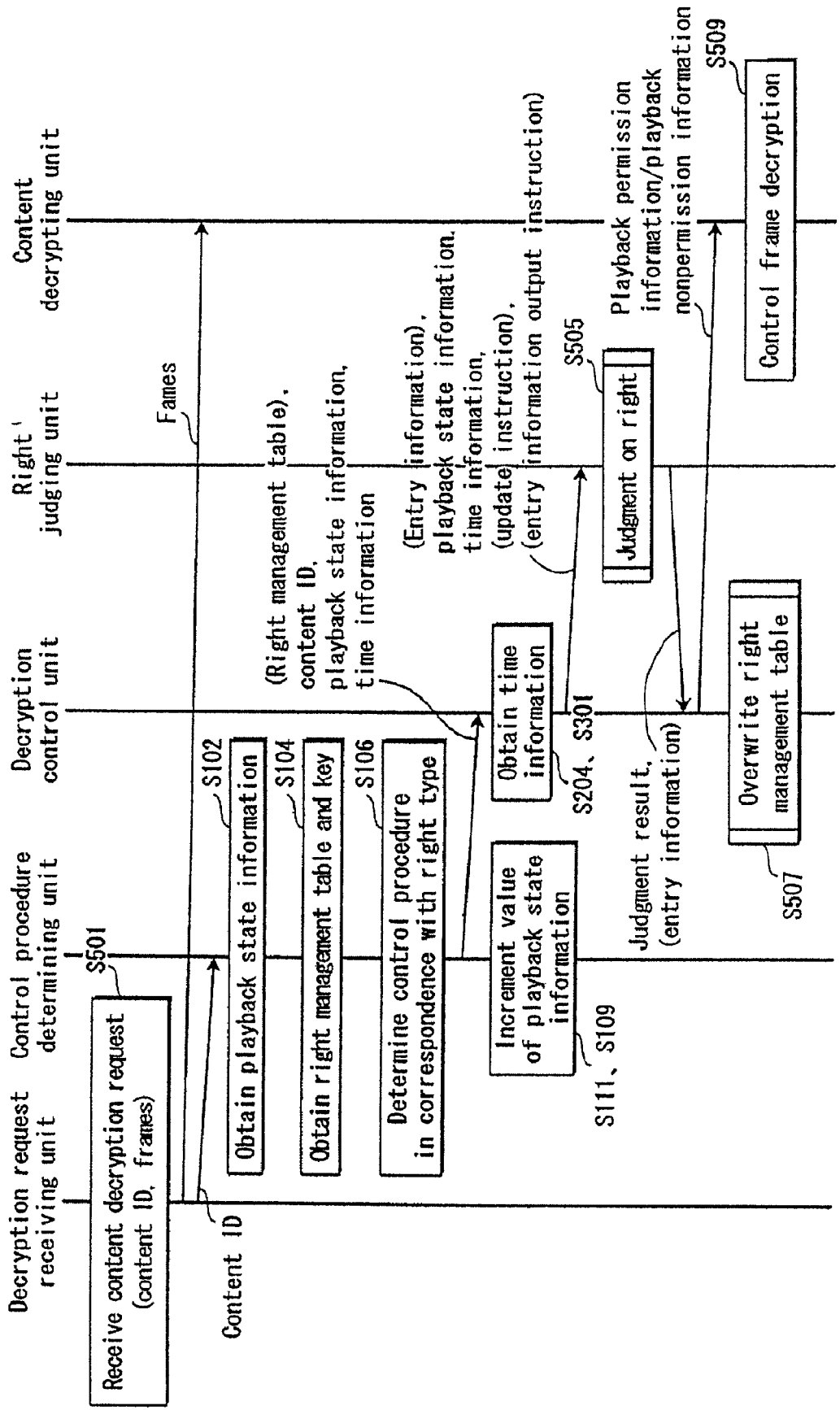
FIG. 12 shows an outline of the operation of the right judgment decryption unit 15.

FIG. 12 shows an outline of the operation of the right judgment decryption unit 15.

As shown in FIG. 12, the decryption request receiving unit 51 receives the content decryption request 23 from the decryption request transmitting unit 14 (S501).

The decryption request receiving unit 51 outputs the frames contained in the content decryption request 23 to the content decrypting unit 61, and outputs the content ID to the control procedure determining unit 52.

The control procedure determining unit 52, as shown in the drawing, performs the process of step S102 or the like having been explained with reference to in FIG. 7. Note that, when the playback state information has not been set to the initial value, the control procedure determining unit 52 does not perform the process of steps S104 and S106. The control procedure determining unit 52 outputs, to the decryption control unit 57, the content ID, the determined control procedure, the decrypted right management table 25, and the playback state information. Note that, when the playback state information has not been set to the initial value, the control procedure determining unit 52 does not output the decrypted right management table 25. The control procedure determining unit 52 then increments the value of the playback state information by one, and stores the incremented playback state information into the playback state storage unit 56 (S109 or S111 shown in FIG. 7).

The decryption control unit 57 performs a different pattern of process depending on the value of the playback state information. The decryption control unit 57 obtains the time information (step S204 in FIG. 8 or step S301 in FIG. 9), and outputs the entry information, playback state information, and time information to the right judging unit 58. Also, the decryption control unit 57 outputs the update instruction and the entry information output instruction, depending on the process pattern. Note that, when the playback state information has not been set to the initial value, the decryption control unit 57 does not output the entry information.

The right judging unit 58 judges whether the right is valid based on the received information (S505). The process of step S505 is the same as that shown in FIG. 10. The right judging unit 58 then outputs the judgment result to the decryption control unit 57. Also, the right judging unit 58 outputs the entry information stored in the right temporary storage unit 59 to the decryption control unit 57 as necessary.

The decryption control unit 57 outputs the playback permission information or the playback non-permission information to the content decrypting unit 61, depending on the judgment result received from the right judging unit 58. The decryption control unit 57 overwrites the right management table 25 in the storage area 20 during the pattern Q process (S507). The process of step S507 is the same as the process of steps S308 through S310 shown in FIG. 9.

The content decrypting unit 61 decrypts the frame when it receives the playback permission information (S509); and does not decrypt the frames when it receives the playback non-permission information.

1.4.5 Outline of Operation of Right Judgment Decryption Unit 15

Here will be described an outline of the operation of the right judgment decryption unit 15.

Figure 13:
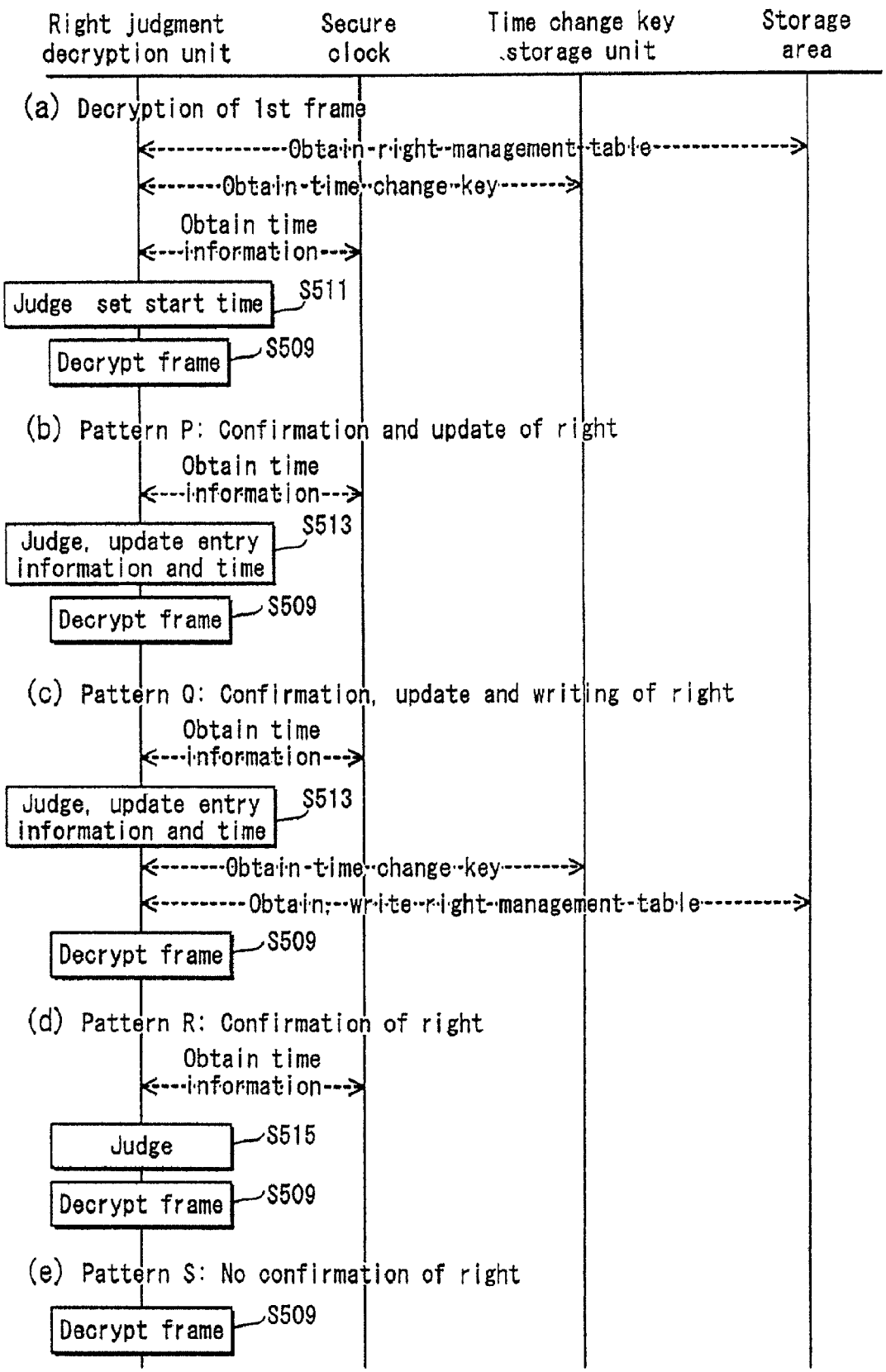
FIG. 13 shows an outline of the operation of the right judgment decryption unit 15.

FIG. 13 shows an outline of the operation of the right judgment decryption unit 15.

Part (a) of FIG. 13 shows an outline of the operation of the right judgment decryption unit 15 immediately after a playback of a content is started, namely, when the playback state information has been set to the initial value. The right judgment decryption unit 15 obtains the right management table 25 from the storage area 20, obtains the time change key 31 from the time change key storage unit 30, and obtains the time information from the secure clock 40. The right judgment decryption unit 15 then causes the right judging unit 58 to make a judgment on the right and stores the obtained time information into the start time storage unit 60 (S511). The right judgment decryption unit 15 then decrypts the frame in accordance with the judgment result (S509).

Part (b) of FIG. 13 shows an outline of the operation of the right judgment decryption unit 15 when the decryption control unit 57 performs the pattern P process. The right judgment decryption unit 15 obtains the time information from the secure clock 40, and causes the right judging unit 58 to make a judgment on the right, update the entry information stored in the right temporary storage unit 59, and update the time information stored in the start time storage unit 60 (S513). The right judgment decryption unit 15 then decrypts the frame in accordance with the judgment result (S509).

Part (c) of FIG. 13 shows an outline of the operation of the right judgment decryption unit 15 when the decryption control unit 57 performs the pattern Q process. In this operation, in addition to the operation for the pattern P, the right management table 25 in the storage area 20 is updated to reflect the update of the entry information stored in the right temporary storage unit 59.

Part (d) of FIG. 13 shows an outline of the operation of the right judgment decryption unit 15 when the decryption control unit 57 performs the pattern R process. In the pattern R process, the right judgment decryption unit 15 makes a judgment on the right, but does not update the entry information stored in the right temporary storage unit 59 (S515).

Part (e) of FIG. 13 shows an outline of the operation of the right judgment decryption unit 15 when the decryption control unit 57 performs the pattern S process. In the pattern S process, the right judgment decryption unit 15 does not make a judgment on the right, but decrypts the frame.

1.4.6 Operation of Electronic Device 1

Here will be described the operation of the electronic device 1 having the above-described structure.

Figure 14:
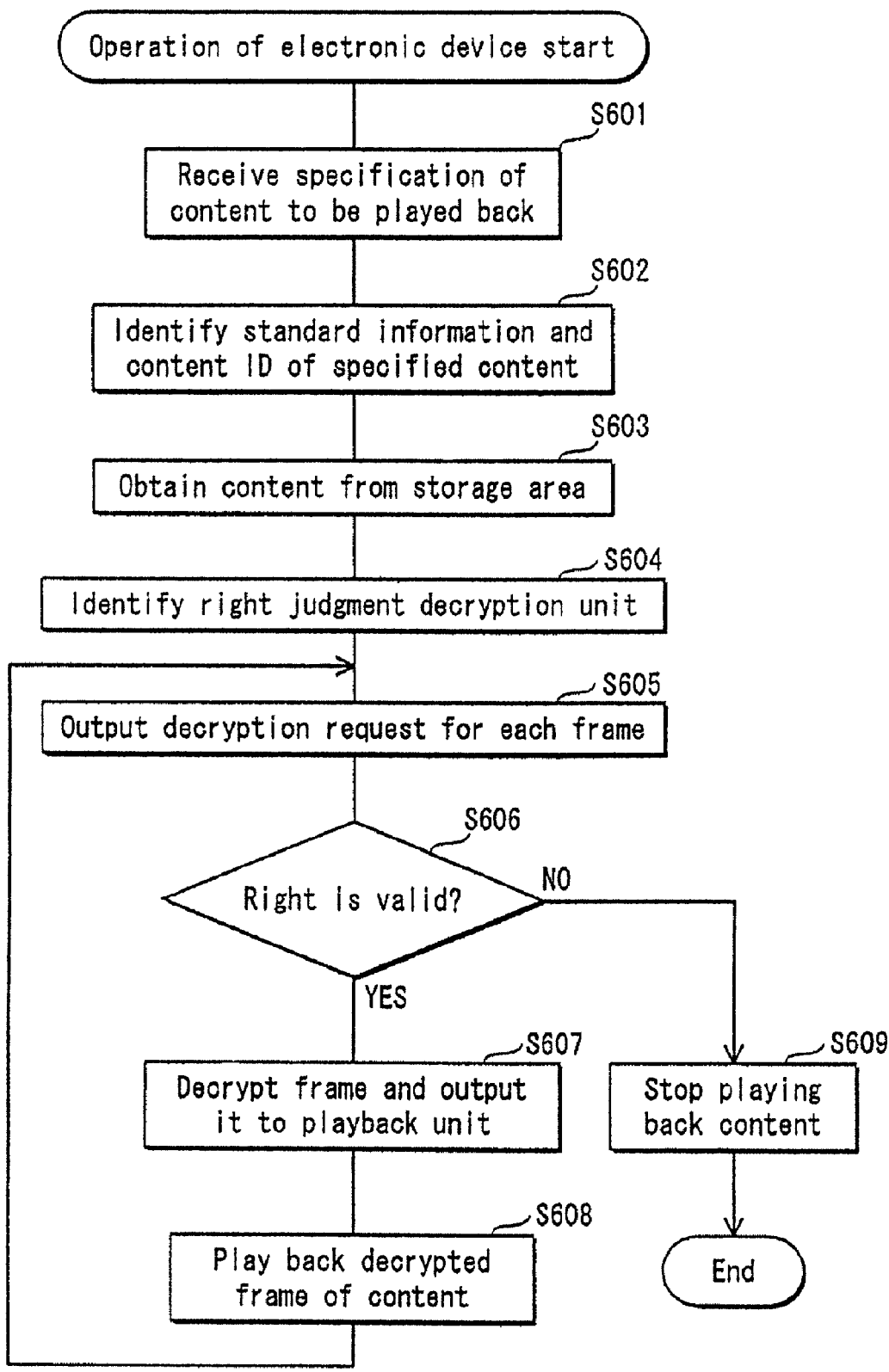
FIG. 14 is a flowchart showing the operation when the content management unit 10 of the electronic device 1 plays back a content.

FIG. 14 is a flowchart showing the operation when the content management unit 10 of the electronic device 1 plays back a content.

The electronic device 1 receives specification of a content to be played back, from the user through the playback request receiving unit 11 (S601).

The content judging unit 12 identifies the standard information and the content ID of the content specified by the user (602).

The content extracting unit 13 refers to the content management table 22, identifies the storage location of the specified content in the storage area 20, and obtains the content from the storage area 20 (S603).

The decryption request transmitting unit 14 identifies the right judgment decryption unit 15 to be used for decrypting the content, from among one or more judgment decryption units 15, based on the standard information (S604). The decryption request transmitting unit 14 outputs content decryption requests 23 each of which contains one frame, one by one to the right judgment decryption unit 15 (S605). Note that two or more frames may be contained in the content decryption request 23.

The right judgment decryption unit 15 causes the right judging unit 58 to judge whether or not the right for the content is valid, in units of a predetermined number of frames (S606). When it judges that the right is valid (YES in S606), the right judgment decryption unit 15 decrypts the frame contained in the content decryption request 23 and outputs it to the playback unit 16 (S607). The playback unit 16 decodes the decrypted frame, and plays back the content by outputting the decoded data (S608). The control then returns to step S605.

When it judges that the right is invalid (NO in S606), the playback unit 16 does not play back (S609), and the content management unit 10 ends the operation.

Note that detailed explanation on the operation of the right judgment decryption unit 15 has already been given, it is omitted here.

Also, although not shown in the flowchart, when the user performs an operation for ending the playback of the content, the electronic device 1 causes the playback unit 16 to stop playing back the content by causing the OS to generate a process interrupt (same as S609). When it performs this, the decryption control unit 57 sets the playback permission flag stored in the playback state storage unit 56 to a value that indicates that the playback is not permitted. Also, when it receives from the user an operation for ending the playback of the content, the decryption control unit 57 may perform the pattern Q process so that the right management table 25 is updated to reflect the update of the entry information stored in the right temporary storage unit 59, and the updated right management table 25 is written to the storage area 20. Further, when it performs this, it may delete the entry information from the right temporary storage unit 59. Also, when it performs this, it may delete the content key stored in the content decrypting unit 61, as explained in "1.3.11 Content Decrypting Unit 61".

2. Embodiment 2

The following will describe Embodiment 2.

In Embodiment 1, the case where the right type is "limit by time" was explained. However, it is possible to make a judgment on the right or update the right in units of frames as described in Embodiment 1, even when the right type is other than "limit by time", for example, when the right type is "limit by period" or "limit by number".

The following description will center on the differences from Embodiment 1.

2.1 When Right Type is "Limit by Period"

First, the operation of an electronic device 1b when the right type is "limit by period" will be explained. The electronic device 1b differs from the electronic device 1 of Embodiment 1 in the operation of the right judgment decryption unit 15. Especially, the operation of the right judging unit 58 differs. More specifically, when the right type is "limit by period", what matters is whether the time exceeds the deadline indicated by the playback deadline 25h in the right management table 25, and the right management table 25 is not updated.

The following will describe the differences from Embodiment 1.

2.1.1 Control Procedure Determining Unit 52

The control procedure determining unit 52 reads out a control procedure which corresponds to the right type "limit by period", in step S106 shown in FIG. 7.

Note that, in S110, the control procedure determining unit 52 may not output the content ID to the decryption control unit 57 during a playback of a content. The following will explain the reason. In Embodiment 1, to update the right management table 25 to reflect the update of the entry information stored in the right temporary storage unit 59, it is necessary to specify entry information in the right management table 25 which should be overwritten with new entry information. For the specification, the content ID is required (see the process in step S309 shown in FIG. 9). However, since the right management table 25 is not updated in the case of the right type "limit by period", there is no need for the decryption control unit 57 to hold the content ID during a playback of a content (note that, even Embodiment 1, the decryption control unit 57 receives entry information stored in the right temporary storage unit 59 from the right judging unit 58, and thus it is possible to specify entry information in the right management table 25 which should be overwritten with new entry information, by referring to the content ID 25a indicated in the received entry information).

2.1.2 Decryption Control Unit 57

The decryption control unit 57 operates in almost the same manner as in Embodiment 1, which has been explained with reference to FIG. 8. The difference is that, in step S211 shown in FIG. 8, the decryption control unit 57 performs the pattern R process (confirmation of right) or the pattern S process (no confirmation of right), and does not perform the pattern P process or the pattern Q process. Note that the decryption control unit 57 may perform only the pattern R process. The operations in the pattern R and S processes have already been described in Embodiment 1, and thus the description thereof is omitted here.

2.1.3 Right Judging Unit 58

The right judging unit 58 operates in almost the same manner as in Embodiment 1, which has been explained with reference to FIG. 10.

Figure 15:
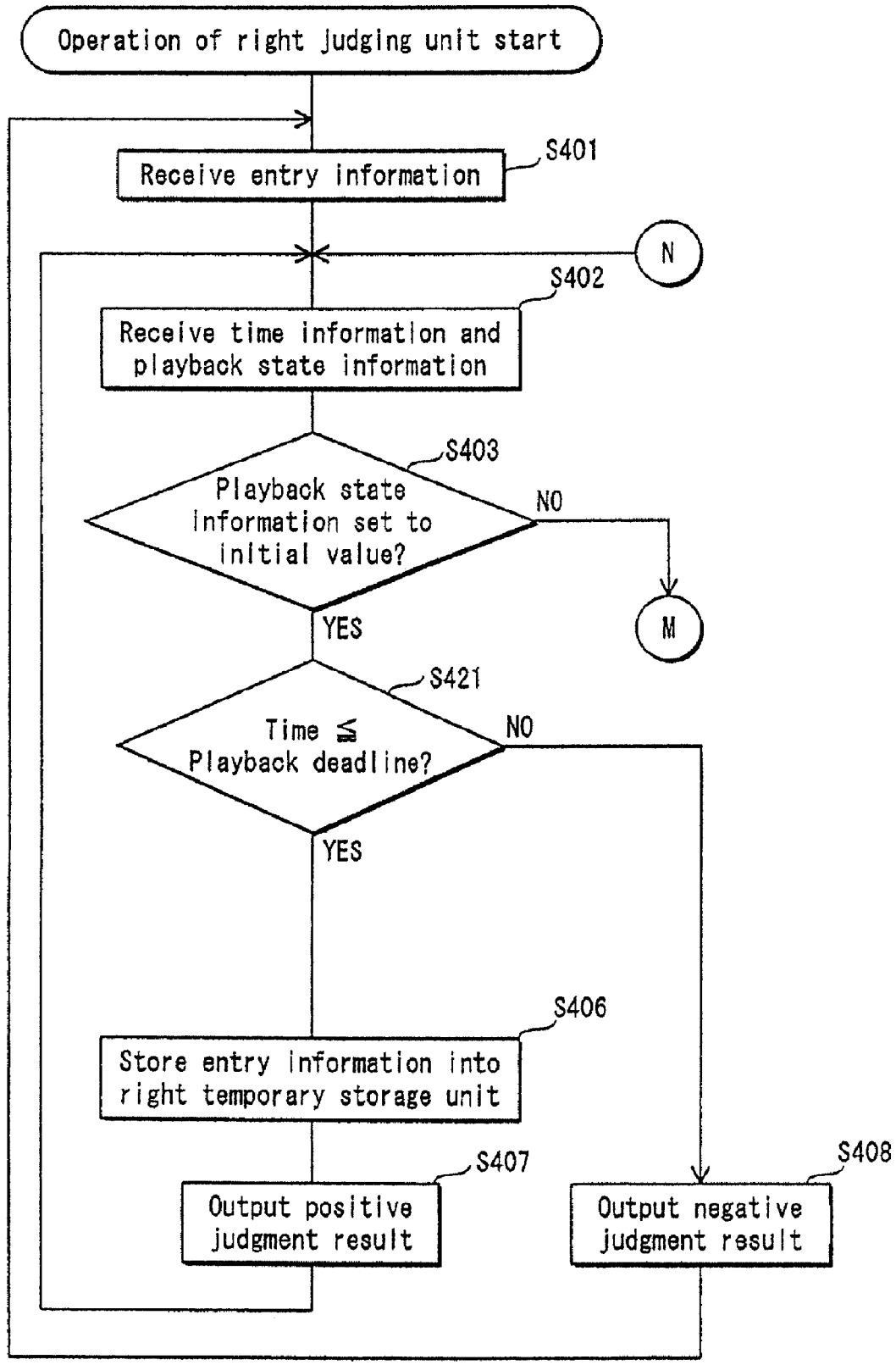
FIG. 15 is a flowchart showing the operation of the right judging unit 58 when the right type is "limit by period".

FIG. 15 is a flowchart showing the operation of the right judging unit 58 when the right type is "limit by period".

The process is performed as shown in FIG. 15. The same processes as those shown in FIG. 10 are assigned with the same reference signs, and description thereof is omitted. The process shown in FIG. 15 differs from the process shown in FIG. 10 in that the right judging unit 58 performs step S421 in place of step S404. Also, the right judging unit 58 does not perform step S405 shown in FIG. 10 when the right type is "limit by period". This is because there is no need to hold the time information. In step S421, the right judging unit 58 judges whether or not the time indicated by the time information obtained from the decryption control unit 57 has exceeded the playback deadline indicated by the playback deadline 25h in the entry information obtained from the decryption control unit 57. Note that, since the playback deadline is generally managed by the date as shown in FIG. 4, the decryption control unit 57 may obtain only the date as the time information.

Next will be described the operation in the case where it is judged in step S403 that the playback state information has not been set to the initial value (NO in step S403), namely, the operation during a playback of a content.

Figure 16:
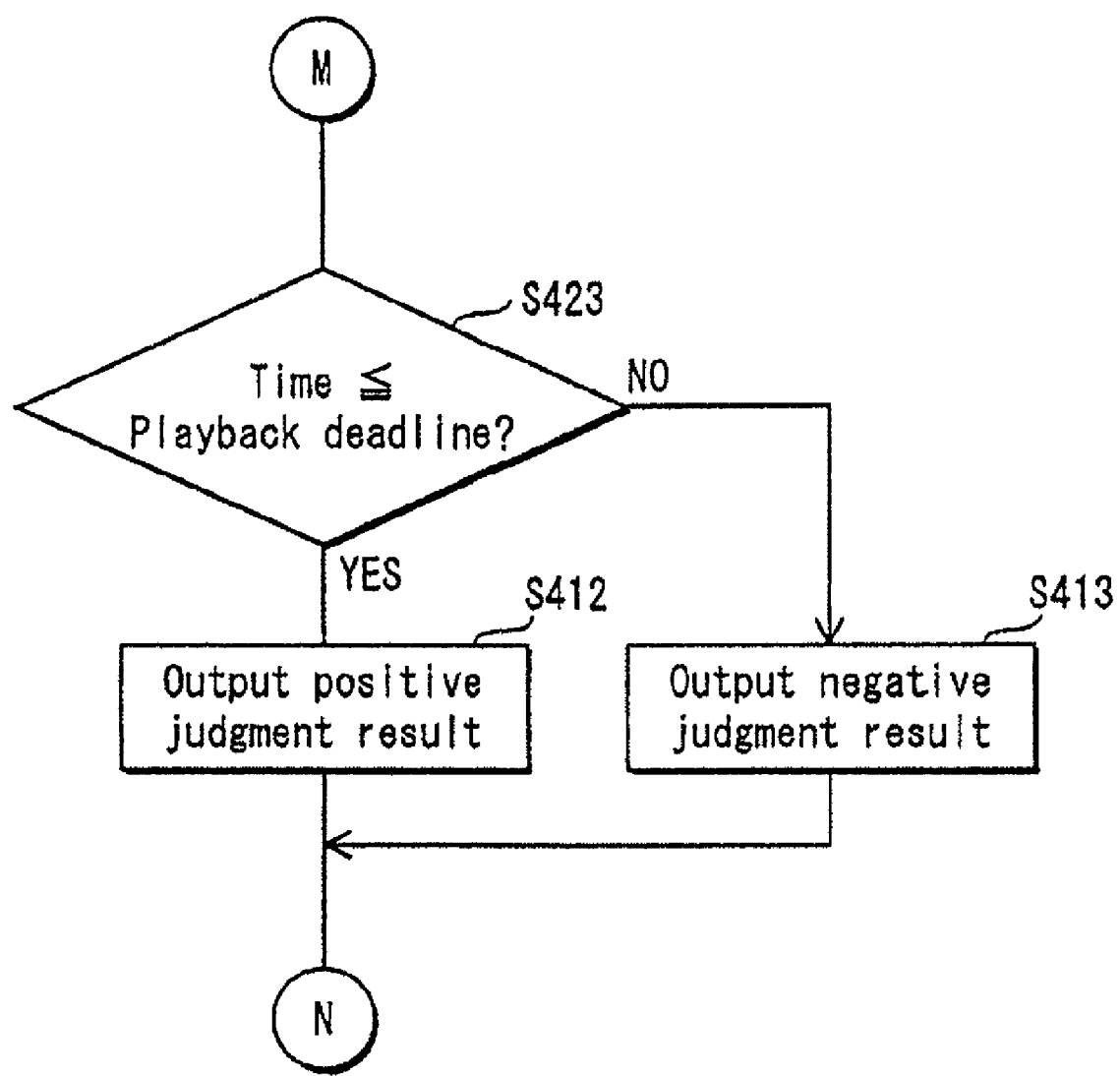
FIG. 16 is a flowchart showing the operation of the right judging unit 58 during a playback of a content when the right type is "limit by period".

FIG. 16 is a flowchart showing the operation of the right judging unit 58 during a playback of a content when the right type is "limit by period".

The corresponding process in Embodiment 1 has been explained with reference to FIG. 11. The process shown in FIG. 16 differs from the process shown in FIG. 11 in that it has step S423 in place of step S411. Also, another difference is that steps S409, S410, and S414 through S418 shown in FIG. 11 are not performed in the process shown in FIG. 16.

The right judging unit 58 judges whether or not the time indicated by the time information obtained from the decryption control unit 57 has exceeded the playback deadline indicated by the playback deadline 25h in the entry information stored in the right temporary storage unit 59 (S423).

When there is time (for example, several days or more) before the deadline indicated by the playback deadline 25h in the right management table 25, there is less need to perform the confirmation of right each time decryption of frame is performed. Accordingly, the confirmation of right may be performed only when there is a small amount of time before the playback deadline (for example, only when a content is played back on the day being the playback deadline).

For example, when it is judged that the time indicated by the time information has not exceeded the playback deadline in step S421 shown in FIG. 15, it may further be judged whether or not the time indicated by the time information matches the date indicated by the playback deadline. When it is judged that the time indicated by the time information matches the date indicated by the playback deadline, the succeeding step S406 and step S423 shown in FIG. 16 and the like are performed one by one; and when it is judged that the time indicated by the time information does not match the date indicated by the playback deadline, output are a positive judgment result and predetermined information for notifying to the decryption control unit 57 that there is no need to perform judgment of right in correspondence with decryption of frame.

Also, when the decryption control unit 57 receives the judgment result and the above-described predetermined information in step S206, the decryption control unit 57 may increase the percentage of the pattern S process (no confirmation of right).

In the above-described example, the entry information is stored in the right temporary storage unit 59, and then confirmation of right is performed. However, there may be a case where the frequency of confirmation of right is not high. Accordingly, the entry information may not be stored into the right temporary storage unit 59, and the right management table 25 may be read out from the storage area 20 each time confirmation of right is performed, and the right judging unit 58 may perform the judgment. In this case, the right temporary storage unit 59 is not necessary.

2.2 When Right Type is "Limit by Number"

Next, the operation of an electronic device 1c when the right type is "limit by number" will be explained. Compared with the case where the right type is "limit by period", especially the operation of the decryption control unit 57 and the right judging unit 58 differs. It is presumed here that the control procedure determining unit 52 determines a control procedure corresponding to the right type "limit by number", and outputs it to the decryption control unit 57.

In the present embodiment, confirmation of right (namely, whether or not the number of playbacks of the content has exceeded the number of playbacks permitted by right) is performed for a content when a playback of the content is started, and the right management table 25 in the storage area 20 is updated after a predetermined time has passed since the start of the playback of the content. This arrangement is made to prevent the right from being consumed immediately after a start of the playback because there may be a case where a content starts to be played back without an intention of the user, for example, when the user starts to playback a content by misoperation. Accordingly, this arrangement is made such that the right is consumed after the content is played back to a certain extent.

In the following operation example, when a content starts to be played back, the right judging unit 58 performs confirmation of right, and stores the entry information with incremented number of playbacks into the right temporary storage unit 59. And during a playback of a content, the right judging unit 58 judges whether a predetermined time has elapsed since the start of the playback of the content. When it judges that the predetermined time has elapsed, the right judging unit 58 outputs the entry information stored in the right temporary storage unit 59 to the decryption control unit 57, and the decryption control unit 57 writes the received entry information into the right management table 25 in the storage area 20.

2.2.1 Decryption Control Unit 57

The operation of the decryption control unit 57 when the right type is "limit by number" will be explained. The operation when the playback state information has been set to the initial value is the same as that explained in Embodiment 1 with reference to FIG. 8, and thus description thereof is omitted here. The operation when the playback state information has not been set to the initial value is different from that explained in Embodiment 1. That is to say, details of step S211 shown in FIG. 8 are different from those provided in Embodiment 1.

Figure 17:
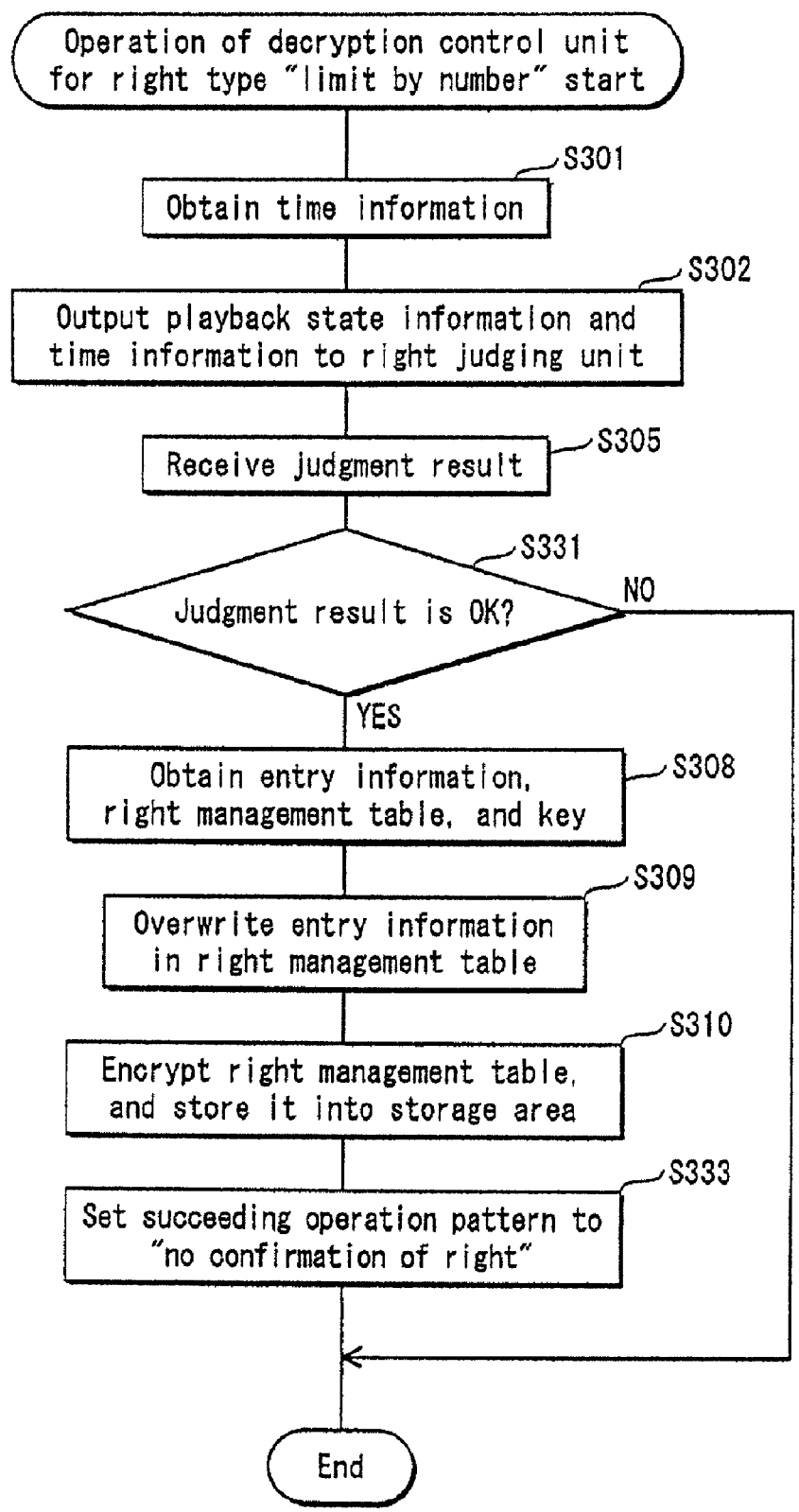
FIG. 17 is a flowchart showing the operation of the decryption control unit 57 when a content of the right type "limit by number" is played back and the playback state information has not been set to the initial value.

FIG. 17 is a flowchart showing the operation of the decryption control unit 57 when a content of the right type "limit by number" is played back and the playback state information has not been set to the initial value. Note that the same processes as those shown in FIG. 9 are assigned with the same reference signs, and description thereof is omitted. The process shown in FIG. 17 differs from the process shown in FIG. 9 in that it does not have steps S303, S304, S307, and S311 shown in FIG. 9 and that step S331 is performed in place of step S306 shown in FIG. 9. Another difference is that step S333 is performed in the process shown in FIG. 17.

In step S331, the decryption control unit 57 receives, from the right judging unit 58, a result of the judgment on whether a predetermined time has elapsed since the start of the playback of the content, and when the received judgment result indicates that the predetermined time has elapsed, the decryption control unit 57 updates the right management table 25 in the storage area 20 by performing steps S308, S309, and S310. After the update, the decryption control unit 57 sets the succeeding operation pattern to "no confirmation of right", namely the pattern S in Embodiment 1. This is because there is no need to perform confirmation of right in the succeeding steps since the right management table 25 in the storage area 20 has already been updated.

2.2.2 Right Judging Unit 58

Next, the operation of the right judging unit 58 will be described.

Figure 18:
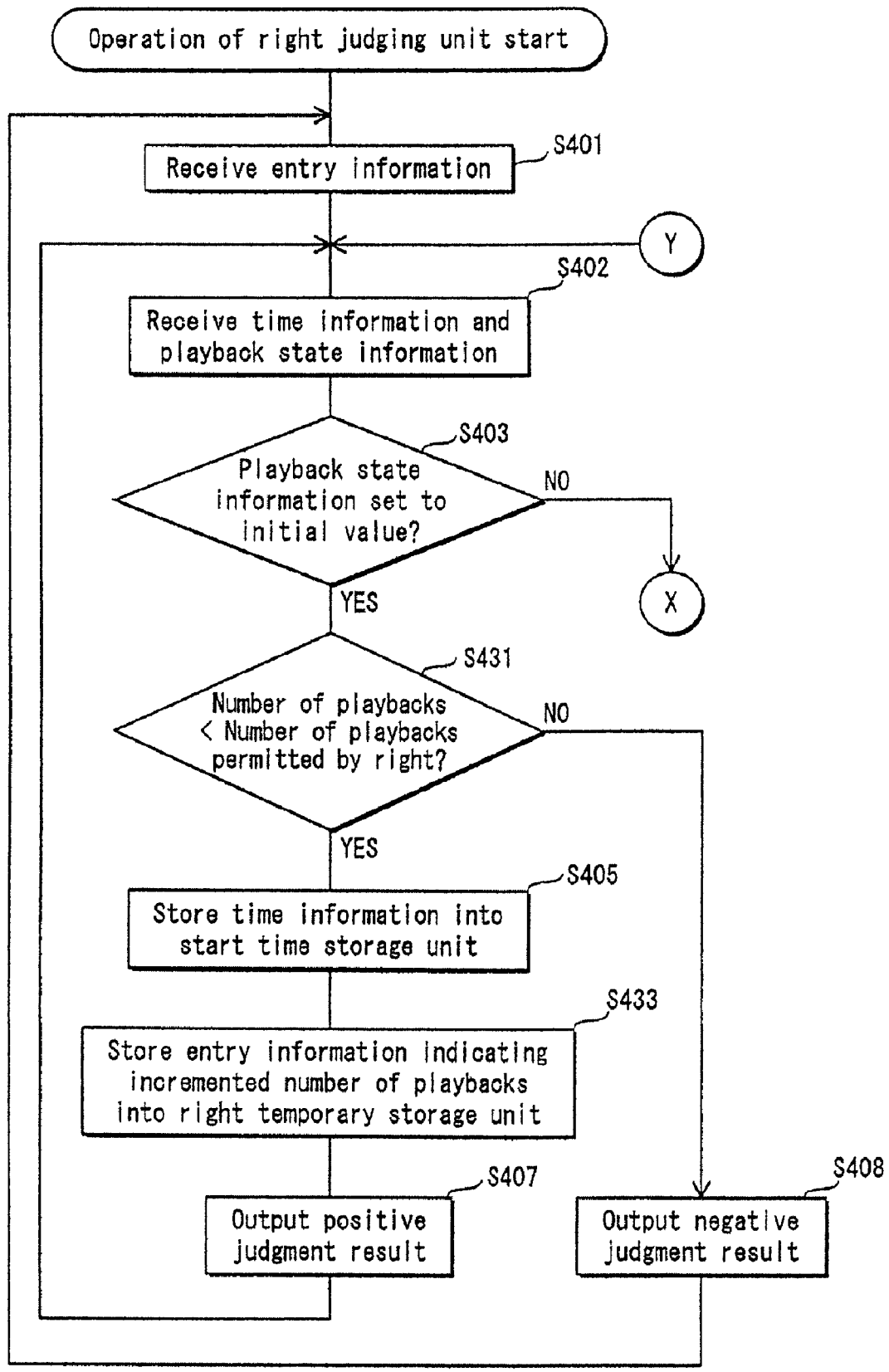
FIG. 18 is a flowchart showing the operation of the right judging unit 58 when the right type is "limit by number".

FIG. 18 is a flowchart showing the operation of the right judging unit 58 when the right type is "limit by number". FIG. 18 mainly shows the operation when the playback state information has been set to the initial value. The operation when the playback state information has not been set to the initial value will be described in detail later with reference to FIG. 19. Note that the same processes as those shown in FIG. 10 are assigned with the same reference signs, and description thereof is omitted.

The process shown in FIG. 18 differs from the process shown in FIG. 10 in that step S431 is performed in place of step S404 shown in FIG. 10, and that step S433 is performed in place of step S406 shown in FIG. 10.

In step S431, the right judging unit 58 judges whether or not the value indicated in the playback number 25d in the entry information received from the decryption control unit 57 is smaller than the value indicated in the right number 25e (the number of playbacks<the number of playbacks permitted by right). When it judges that the value is smaller, the right judging unit 58 performs step S405, increments, by one, the value indicated in the playback number 25d in the entry information, and stores it into the right temporary storage unit 59 (S433).

Next will be described the operation when the playback state information has not been set to the initial value.

Figure 19:
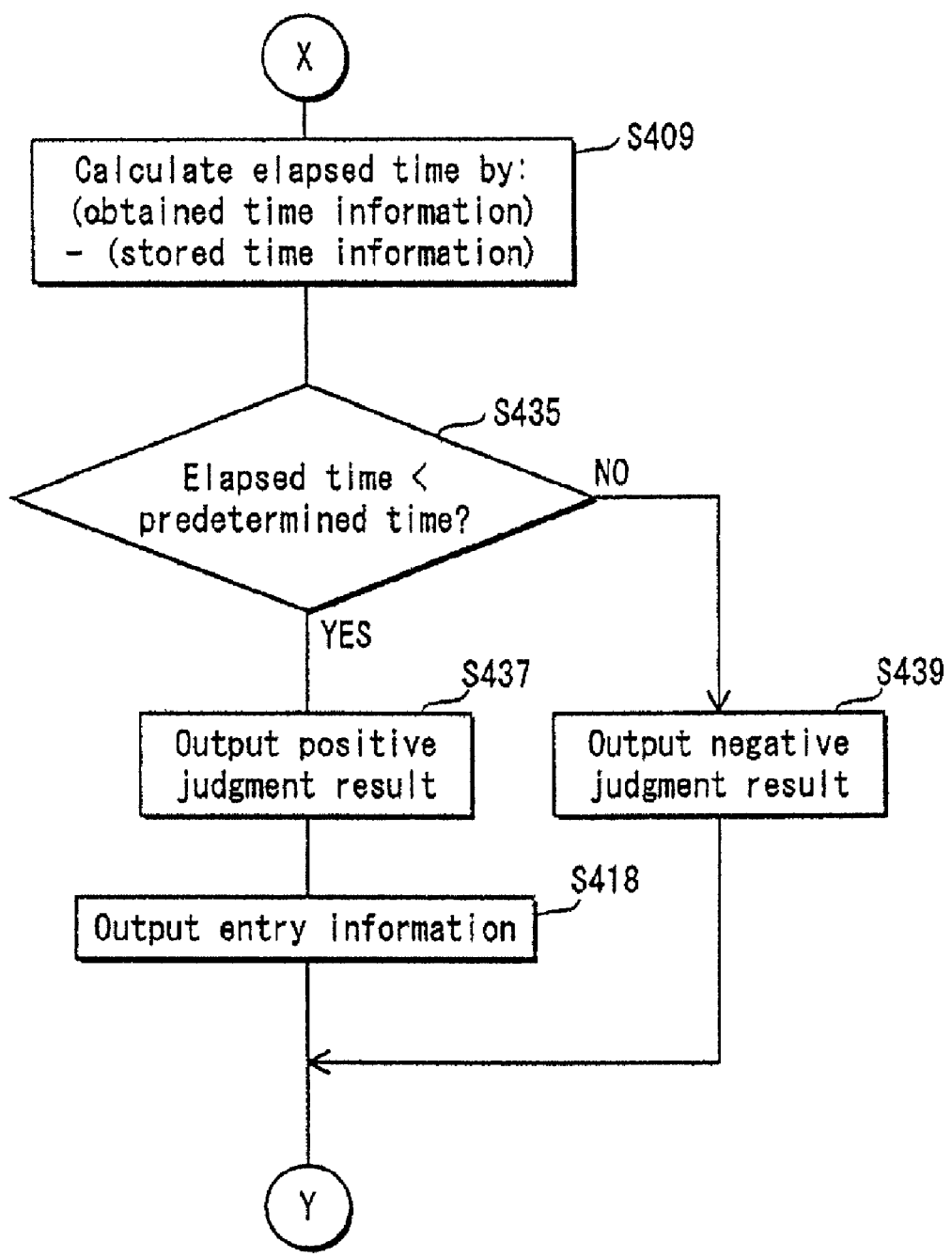
FIG. 19 is a flowchart showing the operation of the right judging unit 58 when the right type is "limit by number" and when the playback state information has not been set to the initial value.

FIG. 19 is a flowchart showing the operation of the right judging unit 58 when the right type is "limit by number" and when the playback state information has not been set to the initial value. Note that the same processes as those shown in FIG. 11 are assigned with the same reference signs, and description thereof is omitted.

The process shown in FIG. 19 differs from the process shown in FIG. 11 in that step S410 and the like shown in FIG. 11 are not performed, and that steps S435, S437, and S439 are performed.

As shown in FIG. 19, the right judging unit 58 calculates an elapsed time in step S409. More specifically, the right judging unit 58 calculates the elapsed time by subtracting the time indicated by the time information stored in the start time storage unit from the time indicated by the time information received in step S402 from the decryption control unit 57.

In step S435, the right judging unit 58 judges whether or not the elapsed time has exceeded the predetermined time. Note that information indicating the predetermined time may be held by the right judging unit 58 preliminarily or may be notified from the decryption control unit 57 in step S401 or S402.

When it judges that the elapsed time has exceeded the predetermined time (YES in step S435), the right judging unit 58 outputs, to the decryption control unit 57, a judgment result indicating that the elapsed time has exceeded the predetermined time (S437), and then performs step S418 and outputs the entry information stored in the right temporary storage unit 59 to the decryption control unit 57.

When it judges that the elapsed time has not exceeded the predetermined time (NO in step S435), the right judging unit 58 outputs, to the decryption control unit 57, a judgment result indicating that the elapsed time has not exceeded the predetermined time (S439).

2.2.3 Other Update Methods

In the above-described example, a comparison between two times is made to judge whether or not the predetermined time has elapsed. Not limited to this, the right management table 25 in the storage area 20 may be updated when the number of frames having been played back reaches a predetermined number.

For example, as described above, when the playback state information has been set to the initial value, the right judging unit 58 may store the entry information with incremented number of playbacks into the right temporary storage unit 59 (S433). Then the decryption control unit 57 may perform decryption of frame without confirmation of right until the value of the playback state information reaches a predetermined value (namely, the pattern S process shown in FIG. 5); and when the value has reached the predetermined value, the decryption control unit 57 may cause the right judging unit 58 to output the entry information stored in the right temporary storage unit 59 to overwrite the entry information in the right management table 25 in the storage area 20 with the output entry information. In this case, the time information is not used. Accordingly, there is no need for the decryption control unit 57 to cause the time information obtaining unit 55 to obtain the time information. That is to say, there is no need for the decryption control unit 57 to perform step S204 shown in FIG. 8. FIGS. 20 through 23 show examples of operations of the decryption control unit 57 and the right judging unit 58 in such a case.

Figure 20:
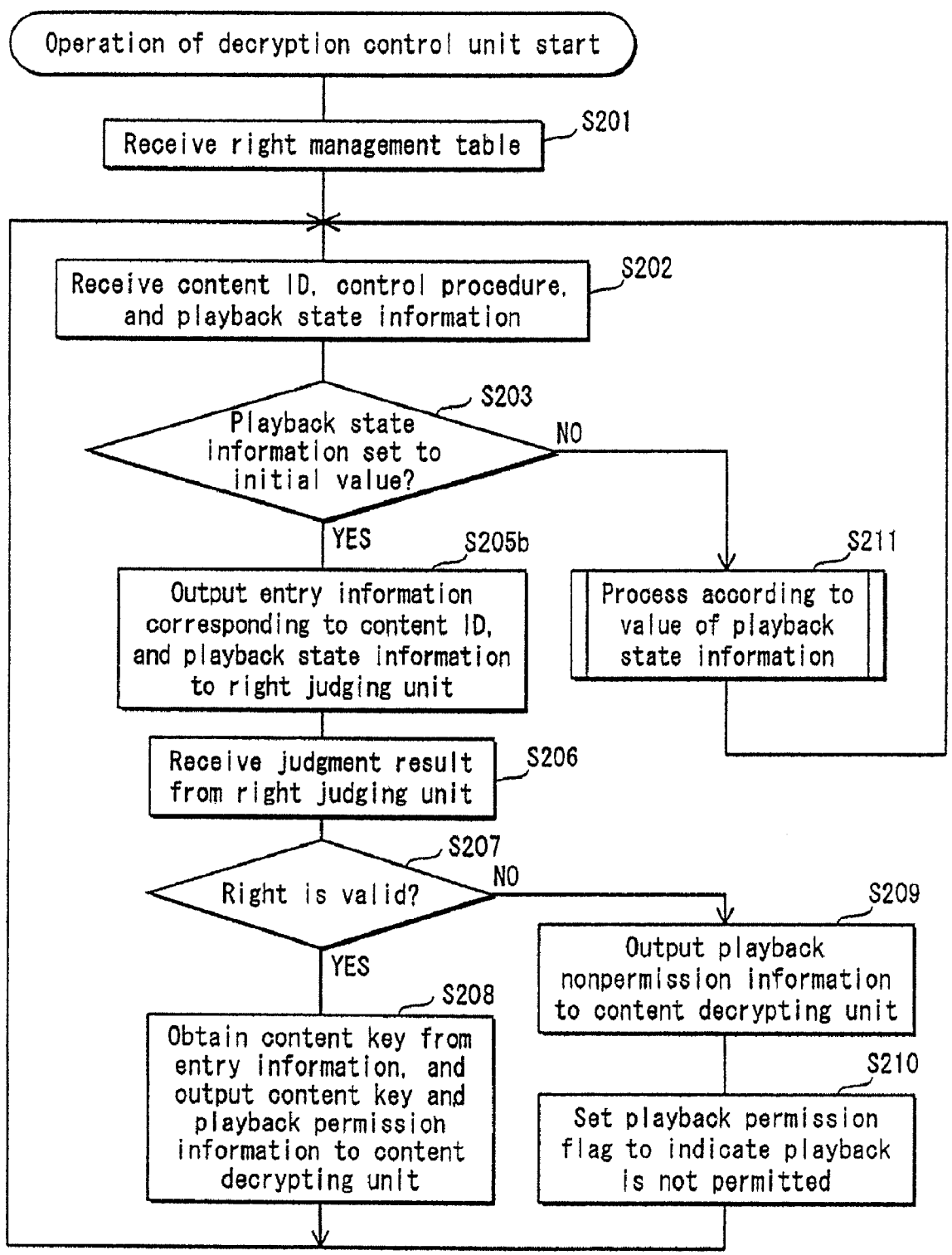
FIG. 20 is a flowchart showing the operation of the decryption control unit 57.

FIG. 20 is a flowchart showing the operation of the decryption control unit 57.

The process shown in FIG. 20 differs from the process shown in FIG. 8 in that step S204 (obtaining the time information) is not performed, and that step S205b is performed in place of step S205 shown in FIG. 8. Also, step S205b differs from step S205 in that the time information is not output.

Figure 21:
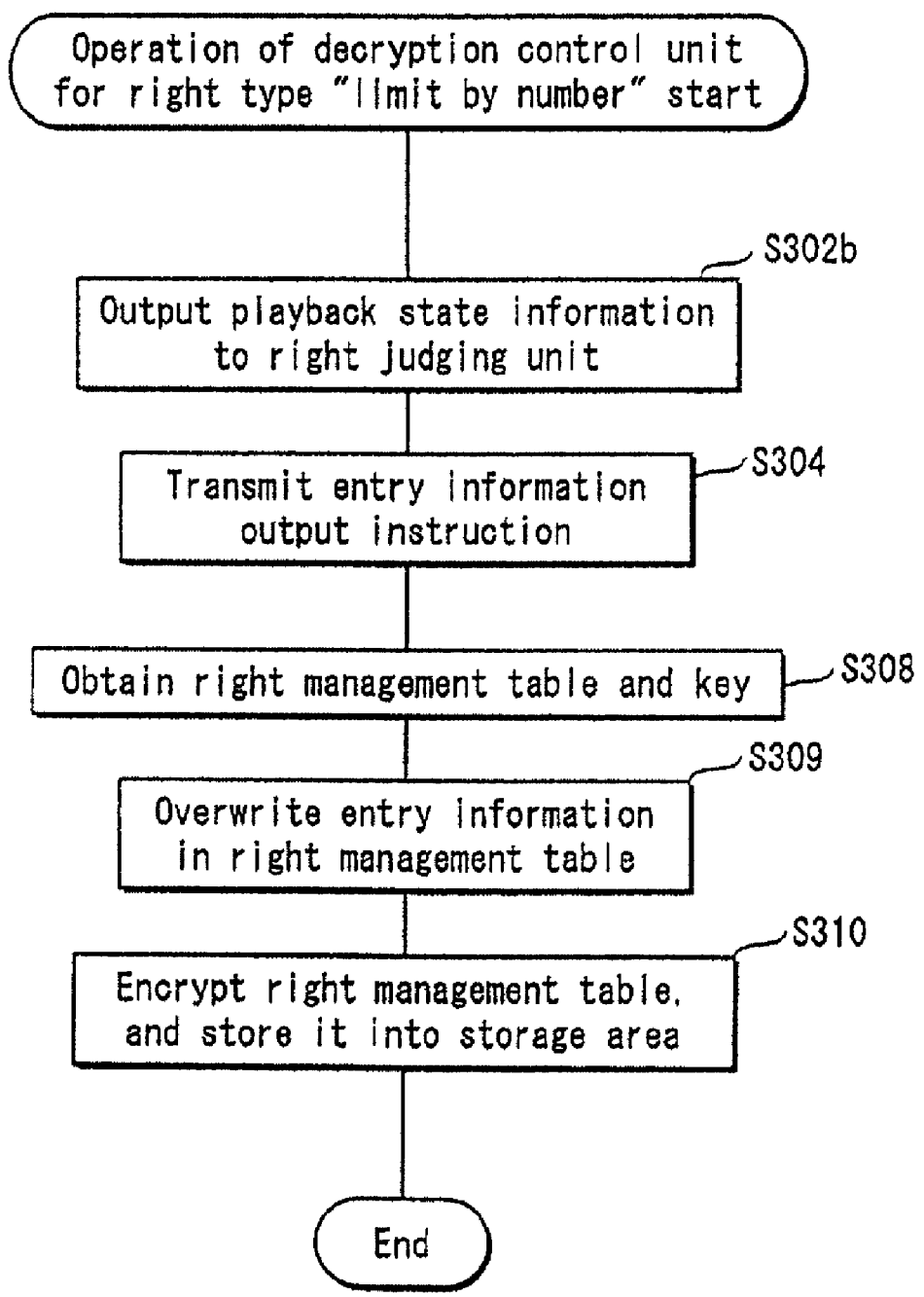
FIG. 21 is a flowchart showing the operation of the decryption control unit 57 updating the right management table 25 in the storage area 20 when the value of the playback state information has reached the predetermined value in the middle of a playback of a content.

FIG. 21 is a flowchart showing the operation of the decryption control unit 57 updating the right management table 25 in the storage area 20 when the value of the playback state information has reached the predetermined value in the middle of a playback of a content. The process shown in FIG. 21 differs from the process shown in FIG. 17 in that steps S301, S305, S331, and S333 are not performed, that step S302b is performed in place of step S302 shown in FIG. 17, and that step S304 is performed. Also, step S205b differs from step S205 in that the time information is not output. Also, step S302b differs from step S302 in that the time information is not output.

After the right management table 25 in the storage area 20 is updated as described above, the decryption control unit 57 performs decryption of frame without performing confirmation of right.

Figure 22:
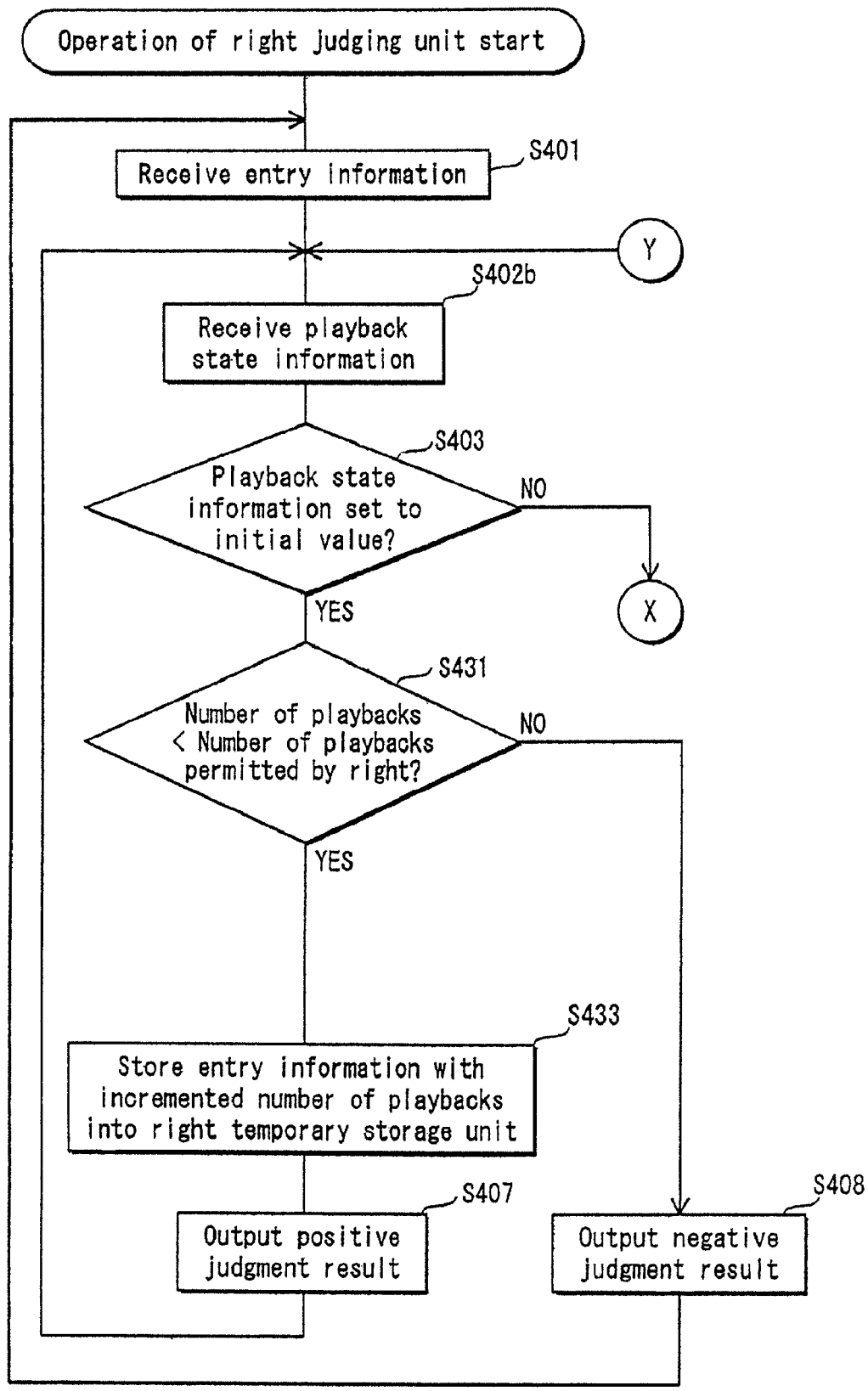
FIG. 22 is a flowchart showing the operation of the right judging unit 58.

FIG. 22 is a flowchart showing the operation of the right judging unit 58.

The process shown in FIG. 22 differs from the process shown in FIG. 18 in that step S405 (storing the time information) is not performed, and that step S402b is performed in place of step S402 shown in FIG. 18. Step S402b differs from step S402 in that the time information is not received.

Figure 23:
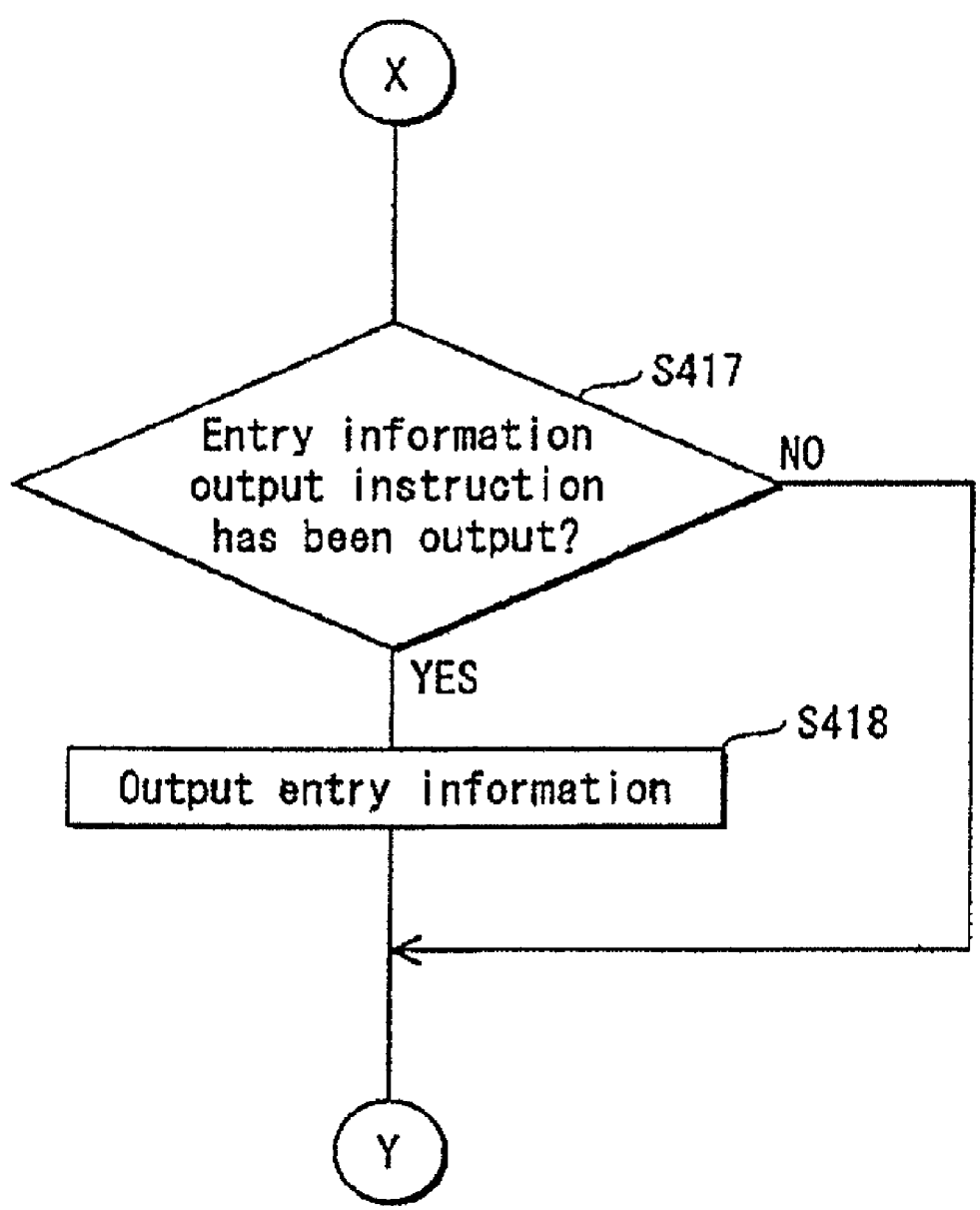
FIG. 23 is a flowchart showing the operation performed when the playback state information is received from the decryption control unit 57 in the middle of a playback of a content.

FIG. 23 is a flowchart showing the operation performed when the playback state information is received from the decryption control unit 57 in the middle of a playback of a content.

The process shown in FIG. 23 differs from the process shown in FIG. 19 in that steps S409, S435, S437, and S439 are not performed, and that step S417 is performed.

Note that each step has already been explained, and description thereof is omitted here.

2.3 Supplemental Notes

When it is found as a result of judgment in Embodiment 1 or 2 that there is no right to use a content, the has cannot be played back, the user notification unit 17 may notify that a content cannot be played back. For example, when the playback period permitted by right has expired, a message such as "Playback period has expired" may be displayed on the display unit.

3. Modifications

Each of the above-described embodiments may be modified as follows.

3.1 Modification 1

Figure 24:
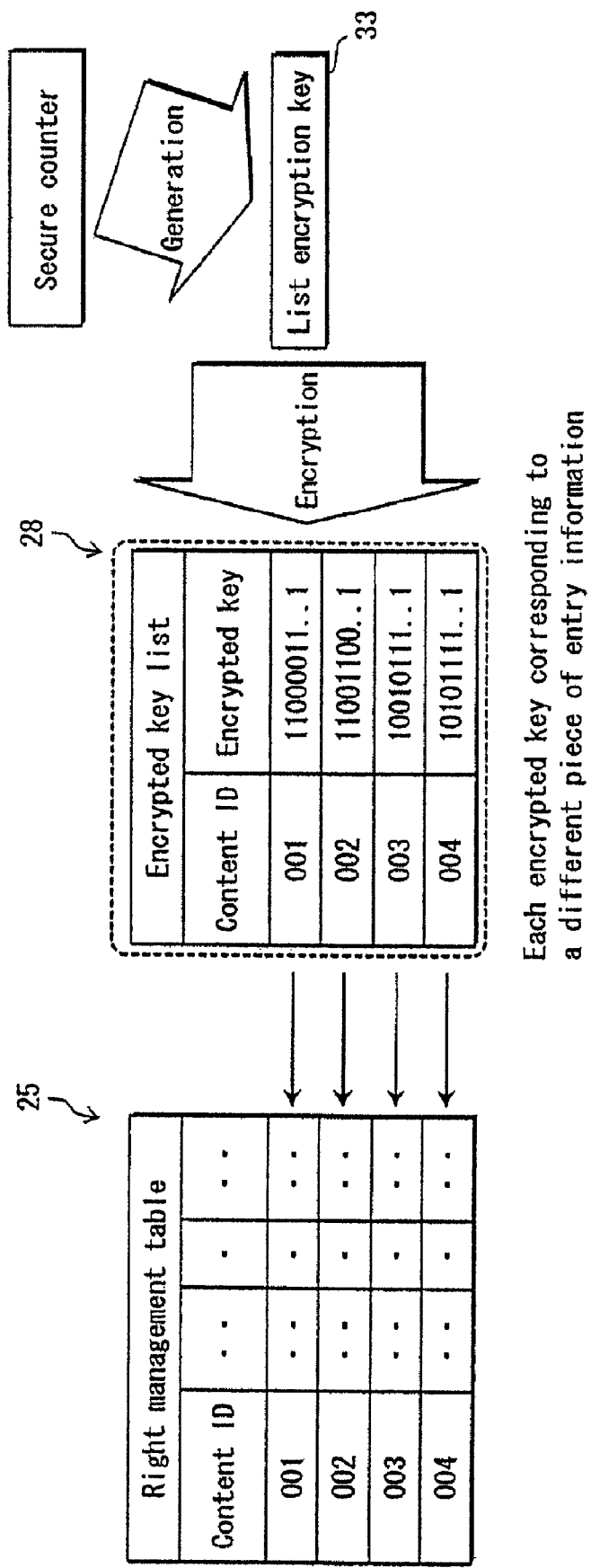
FIG. 24 shows the right management table 25, the encryption key list 28, the list encryption key 33, and the secure counter in Modification 1.

In the above-described embodiments, the right management table 25 is encrypted with use of the time change key 31. Not limited to this, the following modification is possible. As shown in FIG. 24, each piece of entry information stored in the right management table 25 may be encrypted with use of a different encryption key, and encryption keys may be stored as a list (an encryption key list 28) in correspondence with content IDs. And a key used for encrypting the encryption key list 28 (a list encryption key 33) may be generated based on the count value of the secure counter. Note that the encryption of the encryption key list 28 is performed in, for example, the CBC (Cipher Block Chain) mode. It is preferable that the count value of the secure counter is updated at a predetermined timing, for example, when the playback request receiving unit 11 receives a content playback request, or when the right management table 25 in the storage area 20 is updated. The encryption key list 28 is decrypted and encrypted before and after the update. The encryption key list 28 is encrypted with use of the list encryption key 33 generated based on the count value of the secure counter. Note that the count value of the secure counter as it is or one or more predetermined bits extracted therefrom may be used as the list encryption key 33.

It is preferable that the encryption key list 28 or the list encryption key 33 is stored in an area, such as an internal area of a tamper-resistant module, that is protected from unauthorized accesses. Alternatively, the encryption key list 28 or the list encryption key 33 may be stored in the time change key storage unit 30. Each piece of entry information in the right management table 25 has been encrypted with use of a different encryption key. With this structure, even if the right management table 25 has been analyzed in an unauthorized manner, it is difficult to decrypt all pieces of entry information therein. Accordingly, the right management table 25 may be stored in a memory that is outside a tamper-resistant module and can be accessed at a high speed.

Also, in this case, the list encryption key 33 and the encryption key list 28 need to be held in an environment protected from unauthorized accesses. This is because if the encryption key list 28 is analyzed in an unauthorized manner and decrypted, the encryption keys for all pieces of entry information are obtained by the unauthorized accessor.

In this case, the decryption control unit 57 causes the key obtaining unit 53 to obtain the encryption key list 28 and the list encryption key 33, instead of the time change key 31. The decryption control unit 57 then decrypts a piece of entry information in the right management table 25 corresponding to the content ID, using the obtained encryption key list 28 and the list encryption key 33, and outputs the result to the right judging unit 58. When the right management table 25 in the storage area 20 is updated, the encryption key list 28 and the list encryption key 33 are obtained in a similar manner so that the right management table 25 can decrypted and encrypted.

Note that the list encryption key 33 may be the same as the time change key 31.

3.2 Modification 2

In each of the above-described embodiments, part or all of the electronic device 1 may be subjected to a tamper detection process at a predetermined timing.

For example, the electronic device 1 may perform the tamper detection onto the playback unit 16 or the like when the first frame of a content is decrypted. Especially, the electronic device 1 may perform the tamper detection onto a content playback application. This is because it will reduce the possibility that a content is played back in an unauthorized manner by an unauthorized application. The electronic device 1 may further cause the user notification unit 17 to urge the user to update a playback application when it has detected a tamper in the playback application.

Also, the electronic device 1 may perform the tamper detection when the application is updated or installed. The electronic device 1 may further stop executing the application immediately after it has detected a tamper therein during the execution of the application.

3.2.1 Tamper Detection Target

The target of the tamper detection may be the data required to be protected, such as the above-described playback application, data like the right management table 25 that is stored in the storage area 20, or the entry information stored in the right temporary storage unit 59.

3.2.2 Timing of Tamper Detection

The timing of the tamper detection may be when the data to be protected is accessed.

The timing may be, for example, when the right management table access unit 54 obtains the right management table 25 in the storage area 20 (S104, S308 or the like), or when the right management table 25 is updated to reflect the update of the entry information stored in the right temporary storage unit 59 (S309, S310, S418 or the like). Other than these, the tamper detection may be performed onto the right management table 25 in the storage area 20 or onto other data even if the right management table 25 is not updated (for example, when the decryption control unit 57 performs the pattern P process).

Further, the timing of the tamper detection may be when the right judging unit 58 stores the entry information into the right temporary storage unit 59 (S406), when the right judging unit 58 updates the entry information stored in the right temporary storage unit 59 (S415), or when confirmation of right is performed based on the entry information stored in the right temporary storage unit 59 (S411). Still further, the timing of the tamper detection may be when the entry information stored in the right temporary storage unit 59 is not updated (NO in S414), or when the right judging unit 58 does not perform confirmation of right (for example, when the decryption control unit 57 performs the pattern S process).

Still further, the timing of the tamper detection may be when the time information obtaining unit 55 obtains the time information from the secure clock 40 (S204, S301 or the like), or when the time information is stored into the start time storage unit 60 (S405, S416 or the like).

Still further, the timing of the tamper detection may be when the secure counter of the above-described Modification 1 or the secure clock 40 updates the value, or when the value of the secure counter is obtained.

Still further, the timing of the tamper detection may be when a content playback application is activated and the first frame of a content is decrypted, namely, when the playback state information has been set to the initial value.

Still further, the tamper detection may be performed each time the playback state information is set to a predetermined value, namely, each time a predetermined number of frames are decrypted. For example, the tamper detection may be performed each time 25 frames are decrypted.

Figure 25:
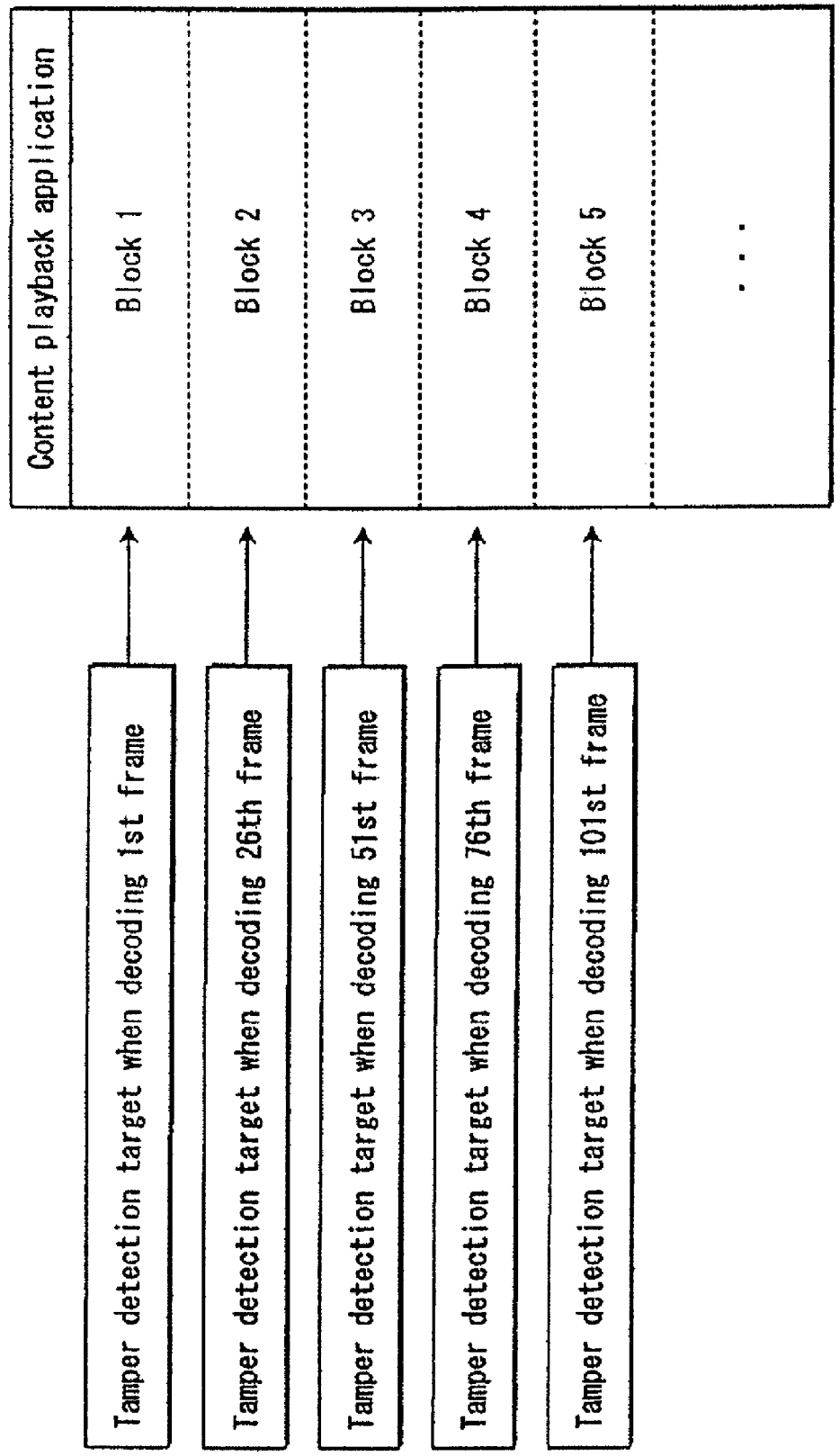
FIG. 25 shows an example case where the tamper detection is performed for each predetermined frame.

Note that it is often difficult to perform the tamper detection onto all detection targets including, for example, a content playback application at once. Accordingly, the tamper detection may be performed such that each tamper detection is performed onto a different part of the tamper detection target in turn. For example, the tamper detection may be performed such that each tamper detection is performed onto a different part of a content playback application in turn. For example, as shown in FIG. 25, the tamper detection may be performed each time 25 frames are decrypted such that the tamper detection is changed in sequence.

3.2.3 Tamper Detection Operation

It is preferable that the above-described tamper detection is performed by a tamper-resistant module. For example, the tamper detection may be performed by the right judgment decryption unit 15 implemented with a tamper-resistant technology. In the case where the tamper detection is performed by the right judgment decryption unit 15, the process by the timer interrupt or the like becomes unnecessary when decryption is performed in units of frames in accordance with the value of the playback state information stored in the playback state storage unit 56 and the tamper detection is performed at regular intervals in units of frames. This makes the implementation easy.

As for the tamper detection method, the following method may be used, for example. First, preliminarily held is a hash value of the data to be protected, such as a content playback application or the right management table 25, and then, during the tamper detection, a hash value of the detection target is calculated and it is judged whether or not the held hash value matches the calculated hash value of the detection target. In this case, it must be taken care, before a content is played back, that the hash value preliminarily held for the comparison is not an unauthorized value. For this purpose, for example, when the application or the right management table 25 is distributed from an authenticate right owner, it is confirmed through an electronic signature that the application or the like has not been tampered, but is an authentic one. Then, before a content is played back, a hash value of the application or the like whose authenticity has been confirmed is preliminarily held. Also, even in the middle of a playback of a content, it may be confirmed through an electronic signature that the application or the like is an authentic one.

3.3 Modification 3

In Embodiment 1, the percentages of the processes of the different patterns performed by the decryption control unit 57 may be changed dynamically in accordance with the operation state of the electronic device 1.

Figure 26:
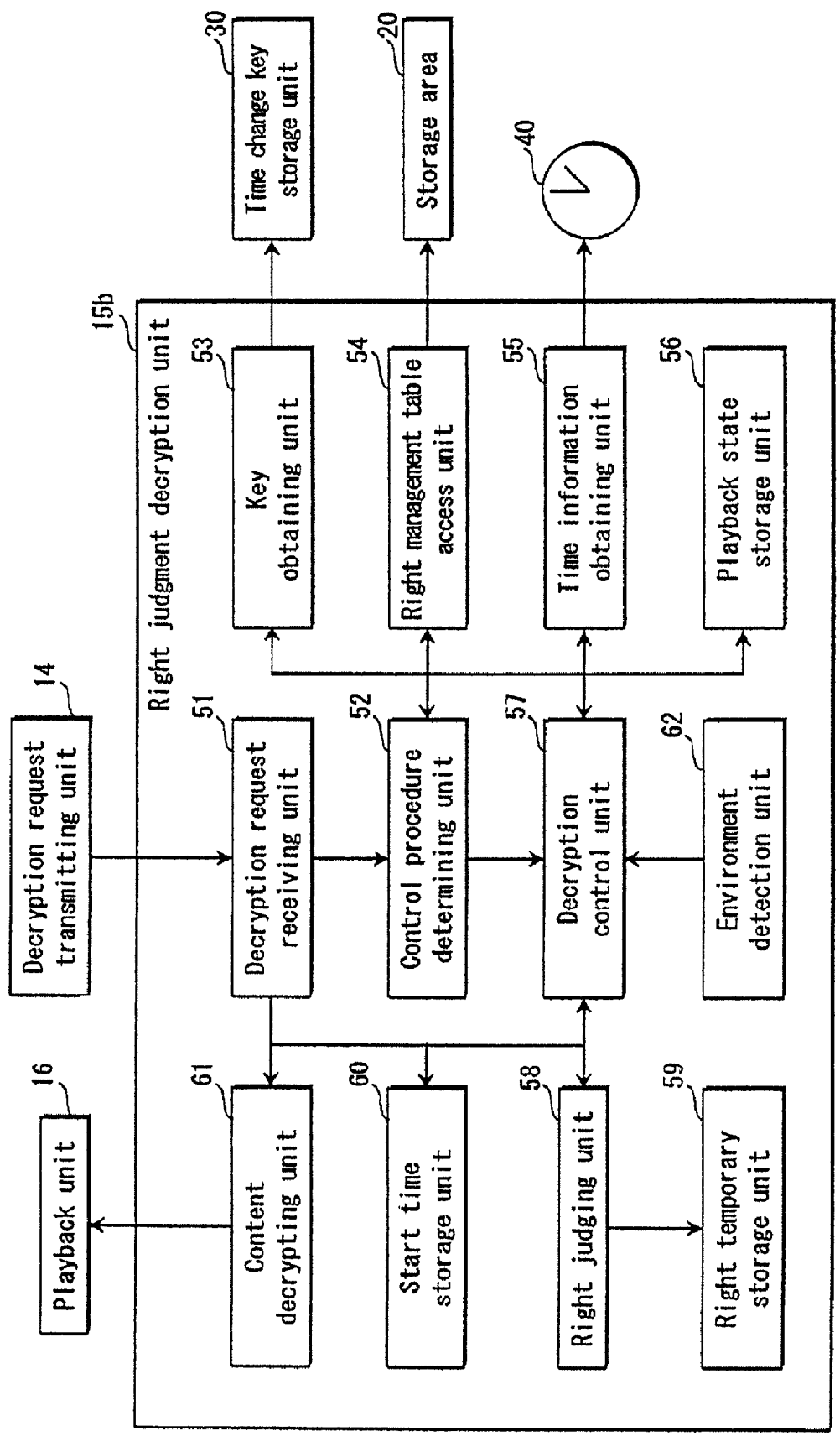
FIG. 26 is a functional block diagram of a right judgment decryption unit 15b in Modification 3.

FIG. 26 is a functional block diagram of a right judgment decryption unit 15*b* in Modification 3. The structure of the right judgment decryption unit 15*b* shown in FIG. 26 differs from the structure of the right judgment decryption unit 15 shown in FIG. 2 in that it includes an environment detection unit 62.

3.3.1 Environment Detection Unit 62

The environment detection unit 62 controls the percentages of the processes of the different patterns performed by the decryption control unit 57 in accordance with the operation state of the electronic device 1. The operation state of the electronic device 1 is, for example, a CPU use rate of the CPU of the electronic device 1. The operation state of the electronic device 1 is managed by the OS (Operation System) of the electronic device 1. The environment detection unit 62 obtains the operation state of the electronic device 1 by accessing the OS.

More specifically, the environment detection unit 62 stores a table, such as the one shown in FIG. 6A. FIG. 6A shows a table 26*a* indicating the CPU use rates of the electronic device 1 in correspondence with the percentages of the patterns (patterns P, Q, R and S, see FIG. 5A) performed by the decryption control unit 57. For example, the environment detection unit 62 detects the CPU use rate, and stores information indicating the percentage of each pattern in correspondence with each range of CPU use rate. The decryption control unit 57 accesses the environment detection unit 62 to refer to the information held by thereby, and determines the percentages of the patterns for not-played-back frames of the content, based on the information. For example, when the environment detection unit 62 detects that the CPU use rate is 10%, the environment detection unit 62 holds information indicating the percentages of the patterns as: "the pattern P is 20%, the pattern Q is 80%, the pattern R is 0%, and the pattern S is 0%". The decryption control unit 57 accesses the information held by the environment detection unit 62 and determines how the processes with the patterns are performed onto the not-played-back frames of the content for each of the frames in the order so that the pattern P is 20% and the pattern Q is 80%. With regards to the frequency with which the decryption control unit 57 accesses the environment detection unit 62, the decryption control unit 57 may access the environment detection unit 62 each time the decryption control unit 57 decrypts a predetermined number of frames, for example.

Here, the process load of each pattern is taken into account when the percentage of each pattern corresponding to the operation state of the electronic device 1 is determined. The pattern Q has the highest process load among the patterns since it performs writing of right into the storage area 20. Therefore, the percentage of the pattern Q may be increased while the electronic device 1 has sufficient processing capability, and the percentages of the other patterns may be increased when the electronic device 1 does not have sufficient processing capability.

Also, a writing condition table 26*b* writing condition table 26*b* as shown in FIG. 6B may be held by the environment detection unit 62 such that the environment detection unit 62 selects a writing condition in accordance with the detected CPU use rate. Here, the writing condition indicates the condition on which the right management table 25 in the storage area 20 is updated to reflect the update of the entry information stored in the right temporary storage unit 59. For example, when the CPU use rate is in a range of 0%-20%, the writing condition is "writing per 1 frame", indicating that the right management table 25 in the storage area 20 is updated by overwriting each time one frame is played back. The environment detection unit 62 outputs the selected writing condition to the decryption control unit 57. Upon receiving the writing condition from the environment detection unit 62, the decryption control unit 57 overwrites the right management table 25 in the storage area 20 in accordance with the received writing condition. More specifically, the decryption control unit 57 stores a value of the playback state information that is obtained when the overwriting of the right management table 25 is performed, and then it performs overwriting of the right management table 25 using the value having already been stored and a value indicated by the playback state information obtained when a frame is decrypted newly. With this structure, the decryption control unit 57 can overwrite the right management table 25 each time the right judgment decryption unit 15 decrypts a predetermined number of frames.

Note that, in this case, as shown in FIG. 6B, when the CPU use rate is 82% or more, there is a possibility that overwriting of the right management table 25 in the storage area 20 is not performed before the playback of the content ends. Accordingly, the decryption control unit 57 may overwrite the right management table 25 each time a predetermined number of frames, for example 50 frames, are decrypted.

As a supplementary note to the overwriting of the right management table 25, not limited to the CPU use rate, the overwriting may be forcibly performed when the playback time of a content has exceeded a predetermined time. For example, the decryption control unit 57 may obtain a content playback start time from the secure clock 40, and stores it as the start time information. After this, the decryption control unit 57 may obtain the time information each time a frame is decrypted, and may forcibly perform the overwriting of the right management table 25 in the storage area 20 when a difference between the times indicated by the start time information and the obtained time information exceeds the predetermined time.

Other than the CPU use rate and the content playback time, for example, when the electronic device 1 is operating by the multitasking, the decryption control unit 57 may determine the timing of the overwriting of the right management table 25 in accordance with the number of times the application is executed. The number of times the application is executed may be obtained by the environment detection unit 62 from the OS and may be notified to the decryption control unit 57. The higher the number of times the application is executed is, the smaller the frequency with which the decryption control unit 57 performs the overwriting of the right management table 25 is.

Also, the decryption control unit 57 may adjust the frequency of overwriting the right management table 25 in accordance with the type (music, moving picture or the like) of the content to be played back. For example, when the content management unit 10 is to play back a moving picture content, whose data amount is larger than that of music data, the decryption control unit 57 may decrease the frequency of overwriting the right management table 25 since it increases the load of the playback process, compared with the case of playing back the music data.

Also, the decryption control unit 57 may determine the timing at which to overwrite the right management table 25 depending on whether the electronic device 1 is in the idle state or the electronic device 1 is operating in the power saving mode. The decryption control unit 57 may increase the frequency of overwriting the right management table 25 when the electronic device 1 is in the idle state, and may decrease the frequency of overwriting the right management table 25 when the electronic device 1 is operating in the power saving mode. In summary, the decryption control unit 57 may overwrite the right management table 25 with a high frequency when the electronic device 1 has sufficient processing capability and fully exerts the capability, and the decryption control unit 57 may decrease the frequency when the electronic device 1 does not have sufficient processing capability.

3.3.2 Supplementary Notes to Modification 3

(1) In the above-described Modification 3, after the environment detection unit 62 determines the percentage of each pattern, the order of assigning the patterns for each of the not-played-back frames may be determined by (a) the decryption control unit 57 or (b) the environment detection unit 62. That is to say, in the case of (a), the environment detection unit 62 dynamically changes the percentage of each pattern performed by the decryption control unit 57, in accordance with the operation state of the electronic device 1, and stores information indicating the percentage of each pattern. Namely, the environment detection unit 62 determines only the percentage of each pattern, but does not determine which pattern should be assigned to each frame. The decryption control unit 57 sequentially obtains, from the environment detection unit 62, information that indicates the percentage of each pattern, and determines which pattern should be assigned to each frame, in accordance with the percentage indicated by the obtained information. Also, in the case of (b), the environment detection unit 62 sequentially determines the percentage of each pattern in accordance with the operation state of the electronic device 1, and further determines the pattern to be assigned to each of the not-played-back frames so that the determined percentage is achieved.

(2) In the "1.4.6 Operation of Electronic Device 1" section of Embodiment 1, the timing when the user performs an operation for ending the playback of a content is described as an example of the timing at which the right management table 25 in the storage area 20 is updated to reflect the update of the entry information stored in the right temporary storage unit 59.

In Embodiment 3, when the environment detection unit 62 or the like detects that the power of the electronic device 1 has decreased, the electronic device 1 may cause the decryption control unit 57 to perform a process of updating the right management table 25 in the storage area 20 to reflect the update of the entry information stored in the right temporary storage unit 59, by causing the OS to generate a process interrupt. In this case, to prevent the overwriting of the right management table 25 from failing due to the lack of power supply, the electronic device 1 may be equipped with an extra battery or the like.

3.4 Other Modification Examples

Up to now, the present invention has been described through several embodiments thereof. However, the present invention is not limited to the embodiments, but includes, for example, the following modifications.

(1) Each device described above is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and each device achieves its functions. The computer program is composed of a plurality of instruction codes that instruct the computer to achieve predetermined functions.

(2) Part or all of the structural elements constituting the devices described above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices may be achieved on one chip, or part or all thereof may be achieved on one chip.

Although the term LSI is used here, it may be called IC, LSI, super LSI, ultra LSI or the like, depending on the level of integration. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(3) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(4) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(5) The present invention may be any combination of the above-described embodiments and modifications.

(6) The present invention may be methods shown by the above. The present invention may be a program that allows a CPU to realize the methods, or may be a digital signal representing the computer program.

(7) Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

(8) The present invention may be any combination of the above-described embodiments and modifications.

The technology of the present invention is useful as, for example, a method for updating the right of the content for which the playback time is limited, when applied to an electronic device which is implemented with a technology of protecting the copyright of the contents, especially in the case where a playback of a content should be immediately ended when the right has been consumed.

The invention claimed is:

1. An electronic device comprising:
a storage unit storing right information used for managing whether or not a content can be played back, the right information being stored in a state protected from unauthorized accesses;
a receiving unit including a microprocessor operable to receive, one by one, a plurality of frames that constitute the content in an encrypted state;
a right judging unit including a microprocessor operable to judge whether or not the content is permitted to be played back, in accordance with the right information;
a control unit including a microprocessor operable to (a) cause the right judging unit to perform the judgment each time an Nth frame, of the plurality of frames, is received by the receiving unit and a value N satisfies a predetermined judgment condition, the value N being a natural number indicating a position of a frame in an order of a playback of the plurality of frames constituting the content, (b) decrypt the Nth frame and cause the decrypted Nth frame to be played back, when the right judging unit judges that the content is permitted to be played back, and (c) restrict the playback of frames, of the plurality of frames, located after the Nth frame, when the right judging unit judges that the content is not permitted to be played back; and
a tamper detection unit including a microprocessor operable to perform a tamper detection for a part of an application module that plays back the content, and each time a tamper is detected, sequentially change the part of the application module for which the tamper detection is to be performed,
wherein the tamper detection unit performs the tamper detection for a first part of the application module when a value indicating a position of a currently received frame, of the plurality of frames received by the receiving unit, satisfies the predetermined judgment condition a first time, and performs the tamper detection for a second part, which is different from the first part, of the application module when the value indicating the position of the currently received frame, of the plurality of frames received by the receiving unit, satisfies the predetermined judgment condition a second time.

2. The electronic device of claim 1,
wherein the content includes at least a first frame and a second frame, which is different from the first frame,
wherein the application module is constituted from a plurality of blocks which include at least a first block and a second block, which is different from the first block, and
wherein the tamper detection unit performs the tamper detection for the first block when the first frame is decrypted, and performs the tamper detection for the second block when the second frame is decrypted.

3. The electronic device of claim 1,
wherein the right information includes playback total time information and playback right time information, the playback total time information indicating a playback total time, which is a total time of playback of the content having been performed, the playback right time information indicating a playback right time, which is a time period for which the content is permitted to be played back,
wherein the right judging unit performs the judgment by comparing the playback right time with a sum of the playback total time and an elapsed time, the elapsed time being a time that has elapsed while the content has been played back, and
wherein the control unit includes a right updating sub-unit including a microprocessor operable to update the playback total time information stored in the storage unit according to the sum of the elapsed time and the playback total time indicated by the playback total time information, in a process of decrypting the Nth frame when the value N satisfies a predetermined update condition.

4. The electronic device of claim 3,
wherein the electronic device further comprises a right temporary storage unit having a storage area which is accessible at a higher speed than the storage unit,
wherein the control unit reads the right information from the storage unit and stores the read right information in the right temporary storage unit,
wherein the right judging unit performs the judgment in accordance with the right information stored in the right temporary storage unit,
wherein the right updating sub-unit performs:
a first process to update the playback total time information stored in the right temporary storage unit according to the sum of the elapsed time and the playback total time indicated by the right information; and
a second process to update the right information stored in the storage unit according to the right information that has been updated and stored in the right temporary storage unit, and
wherein the control unit causes the right updating sub-unit to perform either the first process or both the first process and the second process, depending on the value N, in a process of decrypting the Nth frame.

5. The electronic device of claim 1, wherein the tamper detection unit, while performing the tamper detection for a part of the electronic device, selects, as a target of tamper detection, a part of the electronic device that has not been subjected to tamper detection, each time the tamper detection unit detects a tamper.

6. The electronic device of claim 1,
wherein the electronic device further comprises a user notification unit operable to notify a user, and
wherein, when the tamper detection unit detects a tamper, the user notification unit notifies the user that the application module needs to be updated.

7. The electronic device of claim 1, wherein, when the tamper detection unit detects a tamper, the control unit stops the application module from playing back the content.

8. The electronic device of claim 1, wherein the tamper detection unit performs the tamper detection when the right information stored in the storage unit is accessed, in a process of decrypting a frame of the plurality of frames.

9. The electronic device of claim 1, wherein the tamper detection unit performs the tamper detection in a process of decrypting an initial frame, of the plurality of frames, in the playback of the content.

10. The electronic device of claim 1, wherein the tamper detection unit performs the tamper detection each time a predetermined number of frames, of the plurality of frames, are decrypted, in the playback of the content.

11. The electronic device of claim 1, wherein the tamper detection unit performs the tamper detection when the right judging unit performs the judgment.

12. The electronic device of claim 1, wherein the tamper detection unit performs the tamper detection when a playback application is installed or updated, the playback application being an application that performs a content playback process.

13. The electronic device of claim 1, wherein the control unit restricts the playback of the content when the tamper detection unit detects a tamper.

14. A content playback control method for use in an electronic device for controlling playback of a content, the electronic device including a storage unit storing right information used for managing whether or not a content can be played back, the right information being stored in a state protected from unauthorized accesses, the content playback control method comprising:
receiving, one by one, a plurality of frames that constitute the content in an encrypted state;
judging whether or not the content is permitted to be played back, in accordance with the right information;
causing said judging to perform the judgment each time an Nth frame, of the plurality of frames, is received by said receiving and a value N satisfies a predetermined judgment condition, the value N being a natural number indicating a position of a frame in an order of a playback of the plurality of frames constituting the content;
decrypting the Nth frame and causing the decrypted Nth frame to be played back, when said judging judges that the content is permitted to be played back;
restricting the playback of frames, of the plurality of frames, located after the Nth frame, when said judging judges that the content is not permitted to be played back; and
performing a tamper detection for a part of an application module that plays back the content, and each time a tamper is detected, sequentially changing the part of the application module for which the tamper detection is to be performed,
wherein said performing of the tamper detection performs the tamper detection for a first part of the application module when a value indicating a position of a currently received frame, of the plurality of frames received by said receiving, satisfies the predetermined judgment condition a first time, and performs the tamper detection for a second part, which is different from the first part, of the application module when the value indicating the position of the currently received frame, of the plurality of frames received by said receiving, satisfies the predetermined judgment condition a second time.

15. A non-transitory computer-readable recording medium having a control program stored thereon, the control program for causing an electronic device to play back a content, the electronic device including a storage unit storing right information used for managing whether or not a content can be played back, the right information being stored in a state protected from unauthorized accesses, the control program causing a computer of the electronic device to execute a method comprising:
receiving, one by one, a plurality of frames that constitute the content in an encrypted state;
judging whether or not the content is permitted to be played back, in accordance with the right information;
causing said judging to perform the judgment each time an Nth frame, of the plurality of frames, is received by said receiving and a value N satisfies a predetermined judgment condition, the value N being a natural number indicating a position of a frame in an order of a playback of the plurality of frames constituting the content;
decrypting the Nth frame and causing the decrypted Nth frame to be played back, when said judging judges that the content is permitted to be played back;
restricting the playback of frames, of the plurality of frames, located after the Nth frame, when said judging judges that the content is not permitted to be played back; and
performing a tamper detection for a part of an application module that plays back the content, and each time a tamper is detected, sequentially changing the part of the application module for which the tamper detection is to be performed,
wherein said performing of the tamper detection performs the tamper detection for a first part of the application module when a value indicating a position of a currently received frame, of the plurality of frames received by said receiving, satisfies the predetermined judgment condition a first time, and performs the tamper detection for a second part, which is different from the first part, of the application module when the value indicating the position of the currently received frame, of the plurality of frames received by said receiving, satisfies the predetermined judgment condition a second time.

16. An integrated circuit for use in an electronic device for playing back a content, the electronic device including a storage unit storing right information used for managing whether or not a content can be played back, the right information being stored in a state protected from unauthorized accesses, the integrated circuit comprising:
a receiving unit including a microprocessor operable to receive, one by one, a plurality of frames that constitute the content in an encrypted state;
a right judging unit including a microprocessor operable to judge whether or not the content is permitted to be played back, in accordance with the right information;
a control unit including a microprocessor operable to (a) cause the right judging unit to perform the judgment each time an Nth frame, of the plurality of frames, is received by the receiving unit and a value N satisfies a predetermined judgment condition, the value N being a natural number indicating a position of a frame in an order of a playback of the plurality of frames constituting the content, (b) decrypt the Nth frame and cause the decrypted Nth frame to be played back, when the right judging unit judges that the content is permitted to be played back, and (c) restrict the playback of frames, of the plurality of frames, located after the Nth frame, when the right judging unit judges that the content is not permitted to be played back; and a tamper detection unit operable to perform a tamper detection for a part of an application module that plays back the content, and each time a tamper is detected, sequentially change the part of the application module for which the tamper detection is to be performed, wherein the tamper detection unit performs the tamper detection for a first part of the application module when a value indicating a position of a currently received frame, of the plurality of frames received by the receiving unit, satisfies the predetermined judgment condition a first time, and performs the tamper detection for a second part, which is different from the first part, of the application module when the value indicating the position of the currently received frame, of the plurality of frames received by the receiving unit, satisfies the predetermined judgment condition a second time.

* * * * *